United States Patent
Anazawa et al.

(10) Patent No.: US 10,955,342 B2
(45) Date of Patent: Mar. 23, 2021

(54) LIGHT DETECTION DEVICE

(71) Applicant: HITACHI, LTD., Tokyo (JP)

(72) Inventors: Takashi Anazawa, Tokyo (JP); Yoshinobu Kohara, Tokyo (JP); Chihiro Uematsu, Tokyo (JP); Yusuke Goto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/741,693

(22) PCT Filed: Aug. 21, 2015

(86) PCT No.: PCT/JP2015/073507
§ 371 (c)(1),
(2) Date: Jan. 3, 2018

(87) PCT Pub. No.: WO2017/033224
PCT Pub. Date: Mar. 2, 2017

(65) Prior Publication Data
US 2018/0195959 A1    Jul. 12, 2018

(51) Int. Cl.
*G01N 21/64* (2006.01)
*B01L 7/00* (2006.01)
*B01L 3/00* (2006.01)

(52) U.S. Cl.
CPC .... *G01N 21/6428* (2013.01); *B01L 3/502715* (2013.01); *B01L 3/502784* (2013.01);
(Continued)

(58) Field of Classification Search
CPC ............. G01N 21/6428; G01N 21/645; G01N 21/6486; G01N 2021/6439;
(Continued)

(56) References Cited

U.S. PATENT DOCUMENTS 5,534,703 A * 7/1996 Kambara ........... G01N 21/6456
250/458.1
5,833,827 A * 11/1998 Anazawa ......... G01N 27/44721
204/603

(Continued)

FOREIGN PATENT DOCUMENTS

JP    2010535511 A    11/2010
JP    2015024406 A    2/2015

(Continued)

OTHER PUBLICATIONS

Hindson, B. et al., High-Throughput Droplet Digital PCR System for Absolute Quantitation of DNA Copy Number, Analytical Chemistry 2011, American Chemical Society, 2011, pp. 8604-8610, vol. 83.

(Continued)

*Primary Examiner* — Michael C Bryant
(74) *Attorney, Agent, or Firm* — Procopio, Cory, Hargreaves & Savitch LLP

(57) ABSTRACT

A light detection device comprises: a flow path section in which a plurality of lines of flow of a plurality of droplets 4 dispersed in oil and moving along a linear line of flow is retained on an array plane; a laser beam irradiation section which introduces a laser beam 3 in a direction in which the plurality of lines of flow are arrayed in the flow path section to irradiate the plurality of lines of flow; and a light detection section which detects emitted light generated from the plurality of lines of flow by the irradiation of the laser beam, from a vertical direction with respect to the array plane. A refractive index of the oil no and a refractive index of the droplets nd have a difference such that $-0.02 \leq nd-no \leq 0.05$.

20 Claims, 27 Drawing Sheets

(52) U.S. Cl.
CPC ............... *B01L 7/52* (2013.01); *G01N 21/645* (2013.01); *G01N 21/6486* (2013.01); *B01L 3/5025* (2013.01); *B01L 2300/0627* (2013.01); *B01L 2300/0816* (2013.01); *B01L 2400/049* (2013.01); *G01N 2021/6439* (2013.01)

(58) Field of Classification Search
CPC ................ B01L 3/502715; B01L 7/52; B01L 3/502784; B01L 2300/0816; B01L 3/5025; B01L 2400/049; B01L 2300/0627
See application file for complete search history.

(56) References Cited

U.S. PATENT DOCUMENTS

| | | |
|---|---|---|
| 2004/0089546 A1 | 5/2004 | Bahatt et al. |
| 2005/0017079 A1* | 1/2005 | Psaltis .................... B82Y 10/00 235/468 |
| 2005/0087122 A1 | 4/2005 | Ismagliov et al. |
| 2006/0007439 A1* | 1/2006 | Corcoran ................. G01J 3/02 356/317 |
| 2008/0314761 A1 | 12/2008 | Herminghaus et al. |
| 2009/0042737 A1* | 2/2009 | Katz ................. B01L 3/502761 506/10 |
| 2011/0036992 A1 | 2/2011 | Fukumoto et al. |
| 2017/0212052 A1* | 7/2017 | Anazawa ............... G01N 21/05 |

FOREIGN PATENT DOCUMENTS

| | | |
|---|---|---|
| WO | 98/10122 A1 | 3/1998 |
| WO | 03/027028 A1 | 4/2003 |
| WO | 2004/038363 A2 | 5/2004 |
| WO | 2009021215 A1 | 2/2009 |
| WO | 2015015199 A2 | 2/2015 |

OTHER PUBLICATIONS

International Search Report and Written Opinion for related PCT application No. PCT/JP2015/073507 dated Nov. 17, 2015, 2 pages.
Supplementary Partial European Search Report for related European Application No. 15902196.3, dated Dec. 21, 2018; 20 pages.
Extended European Search Report for related European Application No. 15902196.3, dated Mar. 7, 2019; 19 pages.

* cited by examiner (a)

(b)

(c)

(a)

(b)

(a)

(b)

(a)

(b)

(a) Outer diameter 323μm (Internal refraction index 1.41)

(b) Outer diameter 323μm (c) Outer diameter 300μm (d) Outer diameter 250μm (e) Outer diameter 200μm (f) Outer diameter 150μm (a) Inner diameter 50μm (b) Inner diameter 40μm (c) Inner diameter 30μm (d) Inner diameter 20μm (e) Inner diameter 10μm (a) Inner diameter 50μm (b) Inner diameter 40μm (c) Inner diameter 30μm (d) Inner diameter 20μm (e) Inner diameter 10μm (a)

(b)

(a)

(b)

(a)

(b)

LIGHT DETECTION DEVICE

CROSS-REFERENCE TO RELATED APPLICATIONS

This application is a U.S. National Stage entry of PCT Application No. PCT/JP2015/073507, filed on Aug. 21, 2015, the contents of which are incorporated herein by reference.

TECHNICAL FIELD

The present invention relates to a light detection device for dividing a sample into a number of droplets in oil and then analyzing the sample.

BACKGROUND ART

In recent years, a droplet digital analysis method has gained much attention which involves dividing a sample solution into 10 thousand to 10 million droplets with a volume of picoliter to nanoliter levels in oil, causing a reaction inside the droplets based on the components of the sample, and detecting a reaction result with respect to each droplet to thereby perform sample analysis with high accuracy and high sensitivity. The analysis method, which may be used for various analytes including nucleic acids and proteins, has the advantage that, by implementing a control such that zero or one analyte is included in most of the droplets, a reaction result derived from a single analyte can be obtained, or the absolute number of analytes contained in a sample can be quantitatively determined. For example, by implementing a control such that each droplet contains zero or one cell of a sample, an average or a dispersion of a specific antigen level derived from a single cell can be quantitatively determined, or the ratio of genetic mutation derived from a single cell can be quantitatively determined. Among others, an application to PCR called droplet digital PCR (hereafter referred to as ddPCR®) has made significant progress, and it holds the promise of being used in the field of diagnosis as well as research.

A real-time PCR, which is a major technique for conventional quantitative PCR, successively measures the degree of progression of amplification reaction for each thermal cycle, thereby determining the quantity of an analyte gene that is originally present in the sample. However, in order to perform this technique, it is necessary to measure the degree of progression of amplification reaction of each dilution series of the analyte gene with respect to the number of times of thermal cycles in advance, and to use the progression degree as a standard curve. Accordingly, if the amplification efficiency for an analyte gene in the sample differs from that when the standard curve is acquired, the quantitation result may differ from the reality. On the other hand, ddPCR performs quantitation through digital counting of the analyte gene that is originally present in the sample. Accordingly, ddPCR does not require a standard curve, and is not susceptible to the influence of a change in the analyte gene amplification efficiency. Thus, ddPCR is a simple and highly accurate quantitative PCR. For example, after genome is extracted from a specimen, the genome-extracted solution is mixed with PCR reagent and divided into a number of droplets, and then a digitalized PCR amplification reaction is performed. By utilizing a TaqMan probe, for example, that emits fluorescence in accordance with amount of the presence or absence of mutation, fluorescence intensity of individual droplets is measured, and number of droplets with fluorescence intensity of a threshold value or more is digitally counted. The adoption of a number of droplets provides the advantage of being able to detect low-frequency genetic mutation at relatively low cost.

Currently commercially available ddPCR devices include QX200 from Bio-Rad Laboratories and RainDrop from RainDance Technologies. These ddPCR devices are based on similar mechanisms. The mechanism of the Bio-Rad ddPCR device is illustrated in FIG. 1 of Non Patent Literature 1. First, into a resin-made droplet generator cartridge installed on the ddPCR device, 20 microliters of sample including PCR reagent and oil are loaded, and, by means of vacuum aspiration and a flow focusing nozzle mechanism, approximately 20,000 1 nL-volume droplets are formed in the oil. The droplets are stabilized in the oil by the addition of surfactant. A number of droplets in the oil are then pipette-transferred to a well on a conventional microtiter plate, and end-point PCR is performed using a conventional thermal cycler. Then, again in the ddPCR device, a number of droplets in the oil are vacuum-aspirated and caused to flow single-file in a channel formed in a resin microchip, and, by further adding oil to the channel, the droplets are caused to flow with an increased interval. The channel is irradiated with a laser beam to thereby irradiate the individual droplets in sequence, and emitted fluorescence from the individual droplets is measured in sequence. In this case, while the droplets that included an analyte gene prior to PCR are amplified and emit strong fluorescence after PCR, the droplets that did not include the analyte gene prior to PCR are not amplified and only emit weak fluorescence after PCR. That is, the absolute amount of an analyte gene included in the sample is highly accurately determined by setting an appropriate threshold value with respect to fluorescence intensity, and digitally counting the number of droplets having a fluorescence intensity of more than the threshold value, and the number of droplets having a fluorescence intensity of less than the threshold value.

In ddPCR, various kinds of oil may be used, such as mineral oil, silicon-based oil, and fluorine oil. Generally, oil and the droplets have different refractive indexes. Accordingly, when the droplets are irradiated with a laser beam, interfacial scattering is caused. In order to avoid or reduce the scattering at the droplet interface, Patent Literature 1 proposes matching or approximating the refractive indexes of the oil and droplets. In this way, it is made possible to detect the scattered light derived from cells present in the droplets with high sensitivity.

Patent Literature

Patent Literature 1: WO 2015/015199 A2

Non Patent Literature

Non Patent Literature 1: Anal. Chem. 2011, 83, 8604-8610

SUMMARY OF INVENTION

Technical Problem

In the currently commercially available ddPCR devices, while the droplet forming step prior to PCR is performed with respect to eight samples in parallel, the step of detecting the fluorescence from droplets after PCR is performed in sequence with respect to each sample, thus requiring a longer time. For example, in the case of the RainDrop system from RainDance Technologies, according to its catalog, droplet formation for eight samples ends in about 30 minutes, whereas fluorescence detection for each sample takes about 30 minutes each, thus requiring about four hours for fluorescence detection for the eight samples. In order to perform a higher sensitivity, higher accuracy, and wider dynamic range detection for the analyte, a greater number of droplets may be formed for each sample. However, in this case, the difference in time required for the droplet formation step and the fluorescence detection step would become greater. When the number of samples to be analyzed becomes more than eight, such as when 96 samples are to be analyzed, it may be relatively easy to increase the parallelism of the droplet forming step by 12 times and end the step in the same 30 minutes. However, because the fluorescence detection step is difficult to parallelize, 12 times more time, or about 48 hours, would be required, which is unrealistic. Thus, the step of detecting the fluorescence from droplets is an overall rate-determining step in the ddPCR device. Accordingly, if the throughput of the step can be increased, it would become possible not only to greatly reduce the current analysis time but also to complete a higher sensitivity, higher accuracy, and wider dynamic range analysis within a realistic time.

In order to increase the throughput of the step of detecting the fluorescence from droplets in the ddPCR device, the step may be parallelized. However, the fluorescence detection system is large and expensive, and simply parallelizing the fluorescence detection system would be equivalent to parallelizing the ddPCR device per se, and is unrealistic. Accordingly, in the present invention, a plurality of channels are arrayed so as to enable fluorescence detection from droplets flowing in the respective channels in parallel without greatly increasing the size or cost of the fluorescence detection system, and without a decrease in speed or sensitivity. More specifically, a plurality of channels are arrayed in parallel on the same plane (the array plane) in the same microchip, and the respective channels are irradiated by "side-entry laser-beam irradiation" whereby a laser beam is irradiated perpendicularly to the long axes of the respective channels and along the array plane, so as to detect fluorescence emitted from the respective droplets flowing in the respective channels from a vertical direction with respect to the array plane.

However, when a configuration for side-entry laser-beam irradiation was tested, it became clear that the configuration did not work well due to the influence of scattering and refraction of the laser beam. As will be described later, a detailed review pointed to two major independent causes for this. One cause is that because there is the refractive index difference between the droplets and oil flowing in the respective channels, the droplets function as a concave lens or a convex lens, the lenses moving in a direction crossing the laser beam. As a result, the laser beam spreads from the incident axis, or the traveling direction is varied, preventing the laser beam from efficiently reaching the subsequent channels. In Patent Literature 1, it is proposed to avoid or reduce the scattering of the laser beam at the droplet interface by matching or approximating the refractive indexes of droplets and oil. However, in the document, the purpose is to detect with high sensitivity the scattering derived from cells included in the droplets flowing in a single channel, and no consideration is given to the purpose of fluorescence detection of droplets flowing in each of a plurality of channels by side-entry laser-beam irradiation, as according to the present invention. In addition, in the document, no attempts are made to quantitatively analyze the relationship between the difference in droplet and oil refractive indexes and the laser beam behavior due to the lens effect of the droplets. That is, it is unclear at what values of the refractive indexes of droplets and oil, and at what value of their refractive index difference the side-entry laser-beam irradiation with respect to a plurality of channels would be successful or unsuccessful. The second cause is that both side surfaces of the respective channels formed in the microchip are not vertical with respect to the array plane of the respective channels but are tapered and inclined. In addition, the refractive index of the droplets or oil and the refractive index of the material of the microchip are different, causing the laser beam to be diffracted in one direction and to deviate from the array plane as it passes through the side surfaces of a plurality of channels.

The present invention proposes a technique for overcoming the two causes and thereby achieving side-entry laser-beam irradiation with respect to a plurality of channels in which droplets and oil flow.

Solution to Problem

A light detection device according to the present invention includes a flow path section in which a plurality of lines of flow of a plurality of droplets dispersed in oil along a linear flow is retained on an array plane; a laser beam irradiation section which introduces a laser beam in a direction in which the plurality of lines of flow in the flow path section are arrayed to irradiate the plurality of lines of flow; and a light detection section which detects emitted light generated from the plurality of lines of flow by the irradiation of the laser beam, from a vertical direction with respect to the array plane. The lines of flow are formed in a plurality of channels arrayed on an array plane in a microchip; in a plurality of capillaries arrayed in the air on an array plane; or in a single channel formed by merging the plurality of channels arrayed on an array plane in the microchip.

Herein, to overcome the first cause, on the basis of the results of laser-beam ray-tracing simulations, side-entry laser-beam irradiation of a plurality of lines of flow is caused to function satisfactorily by making a refractive index difference between the refractive index of the droplet nd and the refractive index of oil no, regardless of their respective values, such that $-0.02 \leq nd-no \leq 0.05$, and preferably $-0.01 \leq nd-no \leq 0.03$. When these conditions are satisfied, even if the laser beam is subjected to the influence, more or less, of the lens effect of the droplets in the oil in a certain channel internally holding a line of flow, for example, the laser beam with a sufficient intensity can reach the subsequent channels. Because the refractive index of conventional PCR solutions is typically the same as the refractive index of 1.33 of water, so that the refractive index of the droplets is typically nd=1.33. Accordingly, in this case, the refractive index of oil no is preferably in a range of $1.30 \leq no \leq 1.34$, and is more preferably the same refractive index of 1.33 as the droplets.

To overcome the second cause, the following three solutions are proposed. The first solution is to make both side surfaces of the respective channels, provided in the microchip to form the lines of flow, closer to being vertical with respect to the array plane. Specifically, the angle formed by the side faces and the array plane is made to stay at 90±1.5 degrees. In this way, it becomes possible to suppress the deviation of the laser beam from the array plane. While such microchip may be difficult to fabricate by mass production methods, such as injection molding, cutting processing and the like may be used for its fabrication.

The second solution is to configure the plurality of lines of flow in the inner space of a plurality of capillaries (capillary tubes made of glass) arrayed on the same plane (the array plane), instead of forming them from a plurality of channels arrayed in the microchip. Herein, multiple-laser-beam-focusing technique is known in which, by appropriately adjusting the refractive index of the medium (air or liquid) around the capillaries, the refractive index of the capillary material (glass), the refractive index of the capillary medium, the outer diameter of the capillaries, and the inner diameter of the capillaries, the capillaries are controlled to function as convex lenses, and in which the laser beam entering perpendicularly to the long axes of the respective capillaries and along the array plane is repeatedly focused by the respective capillaries array so as to enable side-entry laser-beam irradiation of the capillaries. The technique is being applied in the capillary DNA sequencer Applied Biosystems 3500xL Genetic Analyzer, which is commercially available from Life Technologies Corporation. In this product, 24 capillaries are arrayed on the same plane, and laser beam irradiation of the 24 capillaries and fluorescence detection from the 24 capillaries by side-entry laser-beam irradiation are performed using the multiple-laser-beam-focusing technique. In order to perform DNA sequencing by electrophoresis in the capillaries, the capillaries are internally filled with an aqueous solution including 8M urea and an electrophoresis separating polymer. It is known that an aqueous solution including 8M urea has a refractive index on the order of 1.41, which is greater than the refractive index of 1.33 of water.

Meanwhile, in the present invention, one of the preferable conditions is that the refractive index of the droplets is 1.33 and the refractive index of oil is made close to 1.33. However, in the configuration of the above product, when the solution with the refractive index of 1.41 in the capillaries is replaced with a solution with a refractive index of 1.33, the multiple-laser-beam-focusing technique fails to function, and the irradiation and fluorescence detection of the 24 capillaries by side-entry laser-beam irradiation becomes impossible. In light of the results of laser-beam ray-tracing simulations, the outer diameter of the capillaries is made not more than 227 μm, or the inner diameter is made not less than 25 μm, or ratio of the outer diameter/inner diameter is made not more than 4.5, so that, even when the capillaries are internally filled with a solution with a refractive index of 1.33, it is made possible for the multiple-laser-beam-focusing technique to function, thus enabling the irradiation and fluorescence detection for the 24 capillaries or a greater number of capillaries by side-entry laser-beam irradiation.

The third solution involves causing the droplets and oil to flow in the plurality of channels formed in the microchip, removing the separating walls between the adjacent channels downstream, merging the plurality of channels into a wider single channel, and making the laser beam laterally enter the plurality of lines of flow formed on the array plane in the merged channel, thereby avoiding the refraction of the laser beam at the side surfaces of the respective channels and the deviation from the array plane, and enabling side-entry laser-beam irradiation and fluorescence detection with respect to the plurality of lines of flow. In this method, it is important to adopt a multiple-sheath-flow technique in which the droplets and oil moving from the respective channels into the merged channel are placed in a laminar flow state, so as to prevent the droplets flowing in the individual channels while being lined up single file from becoming mixed in the merged channel. The plurality of channels that are merged into the single channel may comprise a plurality of capillaries.

Advantageous Effects of Invention

According to the present invention, the throughput of a detection section that is a rate-determining step of a droplet digital analysis method, such as ddPCR, can be increased, whereby the analysis speed and throughput can be increased. These features are particularly effective when an analysis is applied for diagnosis.

Other problems, configurations, and effects will become apparent from the following description of embodiments.

DESCRIPTION OF EMBODIMENTS

Figure 1:
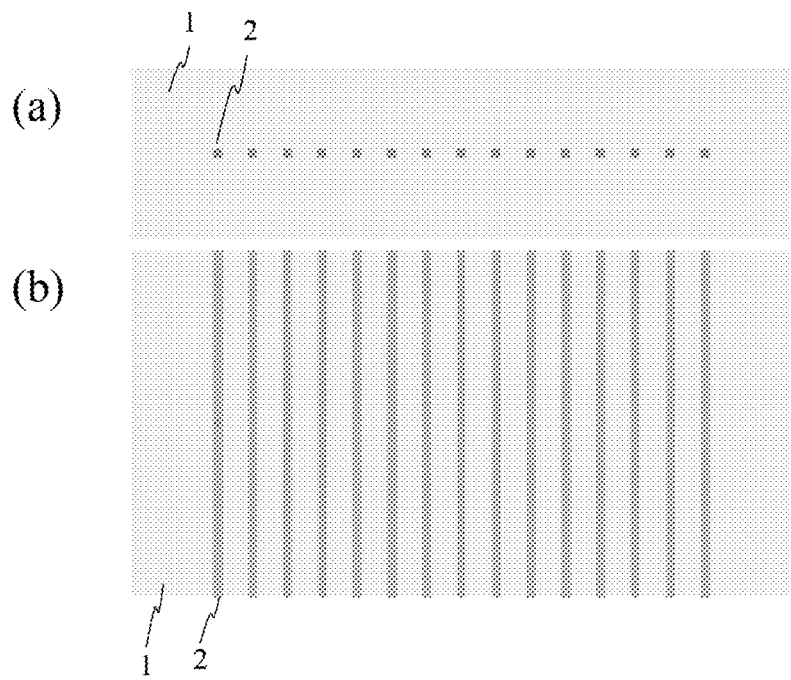
FIG. 1 illustrates a microchip provided with 15 channels.

First, a laser-beam ray-tracing simulation was performed to quantitatively examine what influence a flow of droplets and oil in a channel has with respect to side-entry laser-beam irradiation of a channel array. As illustrated in FIG. 1, a plurality of channels 2 is arrayed on the same plane in a microchip 1. Hereafter, the plane will be referred to as an array plane. FIG. 1(a) is a schematic cross sectional view of the microchip 1 perpendicular to the long axes of the respective channels 2. FIG. 1(b) is a schematic frontal view of the microchip 1 as viewed from a vertical direction with respect to the array plane. The figures each only illustrate a vicinity of the portion irradiated with a laser beam. The material of the microchip 1 is preferably a transparent resin or glass. Herein, the material is a cycloolefin polymer (COP) with a refractive index of 1.53. Fifteen channels 2 are arrayed in parallel at intervals of 200 µm. The respective channels 2 have the cross sectional shape of a square with sides of 50 µm. The respective channels are designated with channel numbers No. 1 to No. 15 in sequence from the left side. The inside of the respective channels is filled with a mineral oil with a refractive index of 1.48. In addition, in FIG. 2 to FIG. 7, a droplet comprising an aqueous solution with a diameter of 40 µm and a refractive index of 1.33 was disposed at a predetermined position of channel 2 No. 1. The periphery of the droplet was filled with oil, regardless of the position of the droplet.

FIG. 2 to FIG. 8 illustrate the results of the ray-tracing simulation of the laser beam 3 in a case where, under the respective conditions, the channel array of FIG. 1 was irradiated with the laser beam 3, in a state of being narrowed to a diameter of 40 µm, from the left side perpendicularly to the long axes of the respective channels 2 and along the array plane. In each Figure, (a) and (b), as in FIGS. 1(a) and (b), are a schematic cross sectional view and a schematic frontal view of the microchip 1. In FIG. 2 to FIG. 6, (c) is an enlarged view of (b) at the position irradiated with the laser beam 3 in channel 2 No. 1, where the droplet 4 is disposed at a predetermined position in the channel 2. In these Figures, the droplet 4 is drawn with an outline so as to make it easier to see the droplet 4.

The laser beam 3 comprises 300 beam elements with an infinitesimal width, the beam elements being uniformly and randomly disposed within the diameter of 40 µm. The laser beam 3 prior to entry into the microchip 1 has a total intensity of 1.00 (100%), with the respective beam elements equally having a 1/300 (0.33%) intensity. In the ray-tracing simulation, the traveling direction and intensity of refracted light were tracked for each beam element by applying Snell's law and Frenel's law at the positions where the refractive index is varied and each time it is varied, such as the incident plane into the microchip 1; the incident plane into the respective channels 2 filled with oil; the exit plane from the respective channels 2; the incident plane into the droplet 4 comprising aqueous solution; and the exit plane from the droplet 4. However, when the beam element totally reflects at the position where the refractive index is varied, the traveling direction and intensity of reflected light were tracked. The Figures indicate the optical paths of the 300 beam elements thus computed. While the ray-tracing simulation was performed on a 3-dimensional model, the Figures show two-dimensional images obtained by projection onto a plane perpendicular to the long axes of the respective channels 2 for sake of clarity. Of the 300 beam elements thus computed, the beam elements that passed through the inside of each of the channel 2 were extracted, and the total of their intensities at their positions was computed as the laser beam irradiation efficiency. That is, the laser beam irradiation efficiency for a channel is 1.0 when all of the 300 beam elements irradiate the inside of the channel with zero intensity attenuation.

Figure 9:
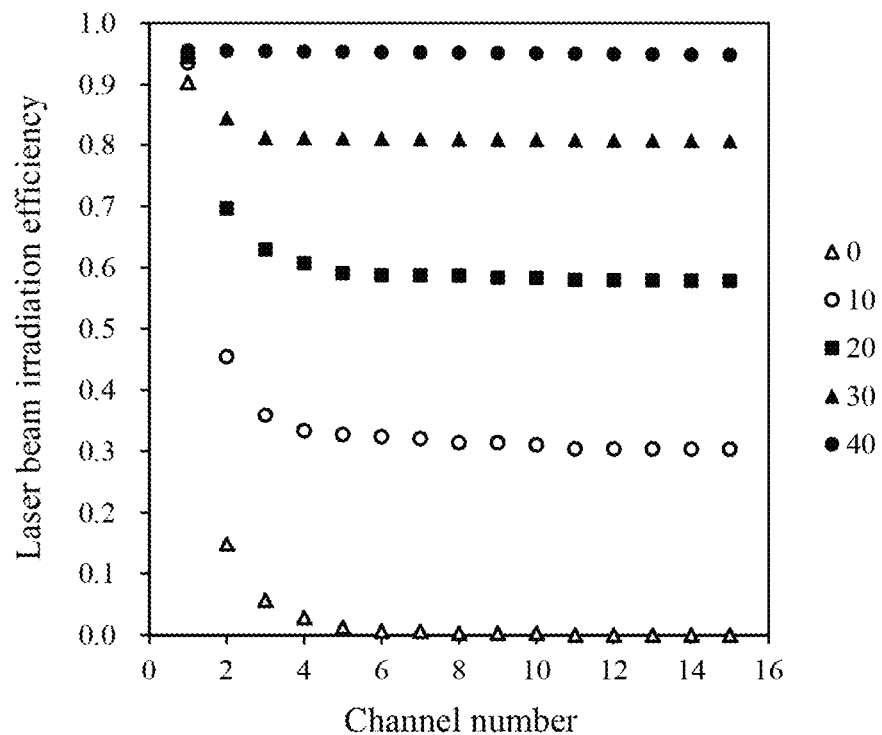
FIG. 9 illustrates the laser beam irradiation efficiency for 15 channels.

FIG. 9 illustrates the results of computation of the laser beam irradiation efficiency versus the channel number under the conditions of FIG. 2 to FIG. 6. The laser beam irradiation efficiency is indicated by the results of computation on a 3-dimensional model. As will be later described with reference to FIG. 22(a) and FIG. 23, in order to obtain the fluorescence detection sensitivity greater than or equal to that of commercially available capillary DNA sequencers, the respective channels only need to have the laser beam irradiation efficiency of not less than 0.4. It is known empirically that practical fluorescence detection sensitivity can be obtained when the respective channels have a laser beam irradiation efficiency of not less than 0.2.

Figure 2:
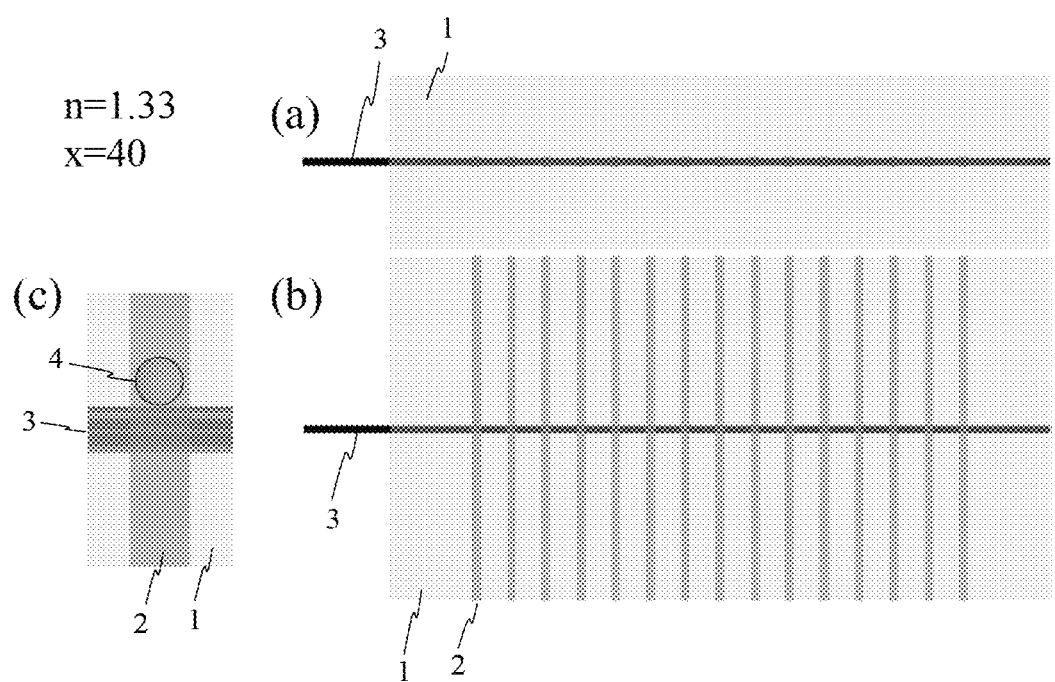
FIG. 2 illustrates the results of side-entry laser-beam ray tracing obtained when a droplet is disposed at a position with a distance X of 40 μm in the first channel.

FIG. 2 illustrates the results in the case where the distance between the droplet 4 and the laser beam 3 was X=40 µm, where the distance X means the distance from the central axis of the laser beam to the center of the droplet. As illustrated in FIG. 2(c), the laser beam 3 does not contact the droplet 4, so that the laser beam 3 is not influenced by the droplet 4 and exhibits the same behavior as when there was no droplet. Because the respective channels 2 have a square cross section, the beam elements have a zero incidence angle at all times to the side surface of the respective channels 2, and no refraction is caused. Accordingly, the laser beam 3 proceeds in the channel array without varying the diameter and central axis thereof, and efficiently irradiate all of the channels 2 in a skewering manner. In FIG. 9, the solid-dot plot indicates the laser beam irradiation efficiency in the respective channels 2 in this case. Because a laser beam reflection loss is caused at each point where the refractive index is varied, the laser beam irradiation efficiency is slightly decreased as the channel number increases. However, substantially equal laser beam irradiation efficiency is obtained among the respective channels 2.

Figure 3:
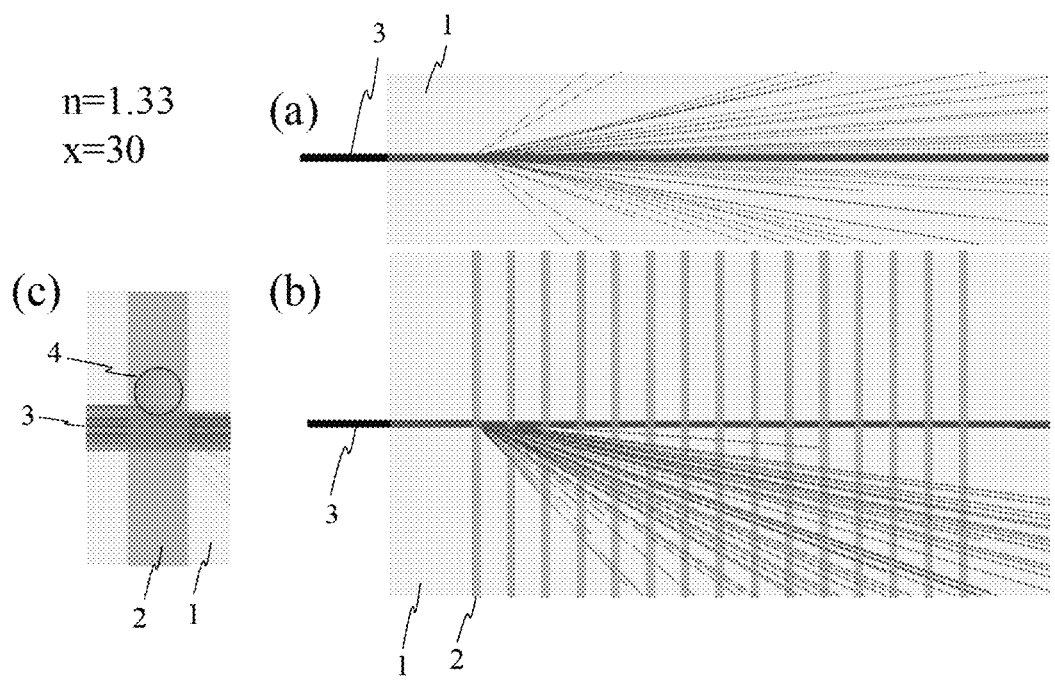
FIG. 3 illustrates the results of side-entry laser-beam ray tracing obtained when the distance X was 30 μm.

FIG. 3 illustrates the results in the case where the distance between the droplet 4 and the laser beam 3 was X=30 μm. As illustrated in FIG. 3(c), the laser beam 3 contacts the droplet 4, and only the beam elements that made the contact are subjected to refraction. The refractive index of 1.33 for the droplet 4 is low compared with the refractive index of 1.48 for the oil in the periphery. Accordingly, the droplet 4 functions as a concave lens with respect to the laser beam 3. Thus, in FIGS. 3(b) and (c), while the droplet 4 is present on the upper side of the incident central axis of the laser beam 3, the laser beam 3 is refracted to the opposite side; i.e., to the lower side of the incident central axis of the laser beam 3. On the other hand, the beam elements that do not contact the droplet 4, as in FIG. 2, travel along the incident central axis of the laser beam 3, and contribute to the irradiation of the respective channels 2. In FIG. 9, the solid-triangle plot indicates the laser beam irradiation efficiency in the respective channels 2 in this case. Because the degree of contact between the laser beam 3 and the droplet 4 is small, the influence on the laser beam irradiation efficiency is also small. The influence of the droplet 4 on the refraction of the laser beam 3 is indicated by the amount of decrease in the laser beam irradiation efficiency from channels 2 No. 1 to No. 3, and none of the influence is observed in channel 2 No. 3 and thereafter.

Figure 4:
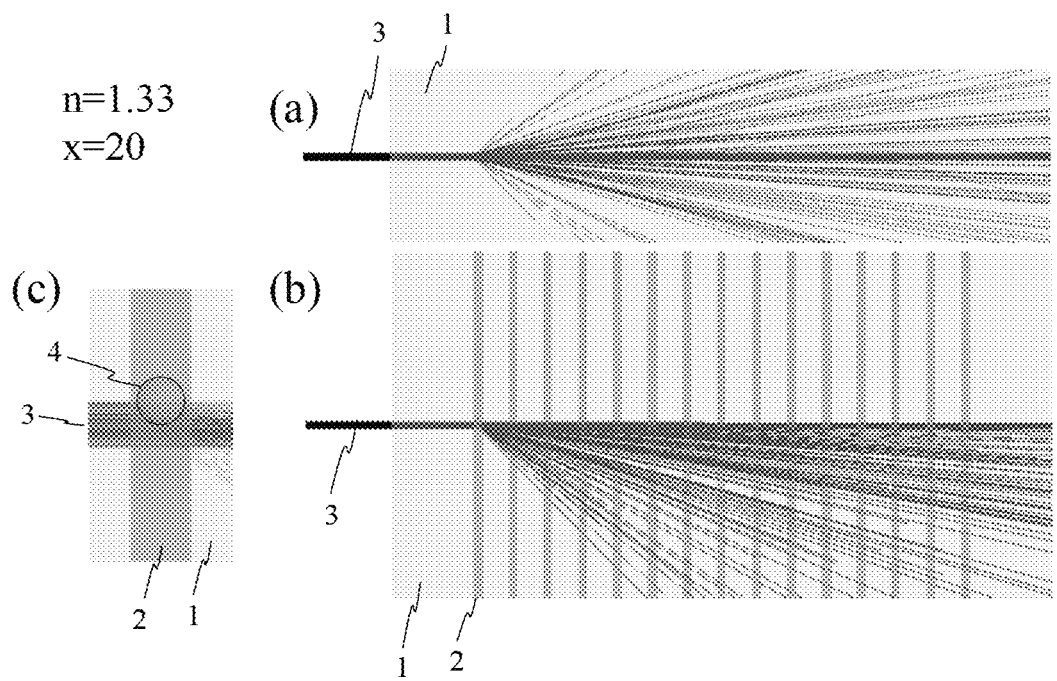
FIG. 4 illustrates the results of side-entry laser-beam ray tracing when the distance X was 20 μm.
Figure 5:
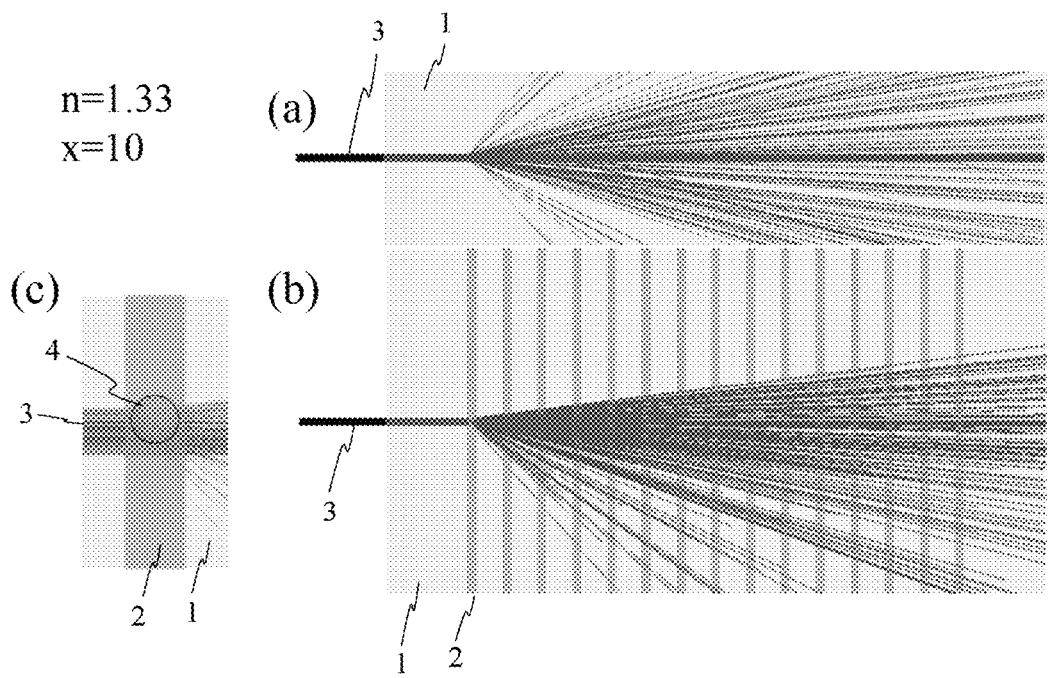
FIG. 5 illustrates the results of side-entry laser-beam ray tracing when the distance X was 10 μm.
Figure 6:
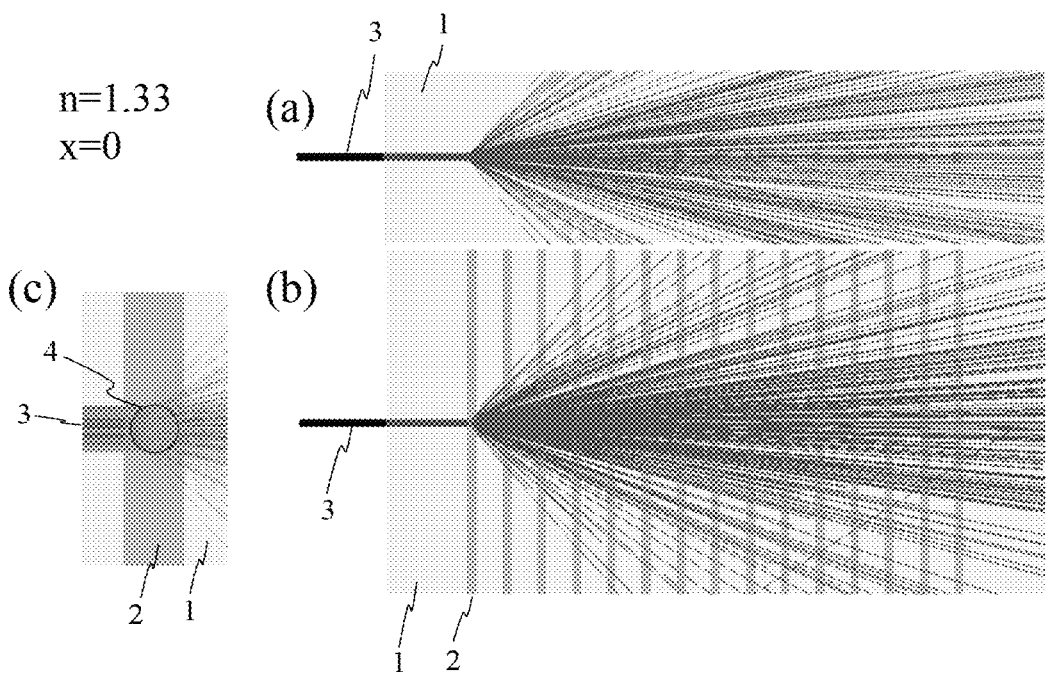
FIG. 6 illustrates the results of side-entry laser-beam ray tracing when the distance X was 0 μm.

Similarly, FIG. 4, FIG. 5, and FIG. 6 respectively illustrate the results in the case where the distance between the droplet 4 and the laser beam 3 was X=20 μm, 10 μm, and 0 μm. As the distance X decreases, the degree of contact between the laser beam 3 and the droplet 4 increases, and the concave lens effect of the droplet 4 increases, causing greater refraction of the laser beam 3. In FIG. 6 where X=0 μm, the centers (axes) of the droplet 4 and the laser beam 3 are aligned. Accordingly, in FIGS. 6(b) and (c), the traveling directions of the laser beam 3 due to refraction are vertically symmetric with respect to the incident central axis of the laser beam 3. In FIG. 9, the solid-square, blank-dot, and blank-triangle plots respectively indicate the laser beam irradiation efficiency in the respective channels 2 in FIG. 4, FIG. 5, and FIG. 6. As the distance X is decreased, the degree of attenuation in laser beam irradiation efficiency with respect to the channel number increases. At X=0, the degree of refraction of the laser beam 3 becomes maximum, and the laser beam irradiation efficiency is substantially zero for channel 2 No. 6 and thereafter. That is, it became clear that, even when the refractive indexes of the droplet 4 and oil are respectively constant, the laser beam irradiation efficiency of the respective channels 2 is greatly varied depending on the relative positions of the droplet 4 and the laser beam 3.

Figure 7:
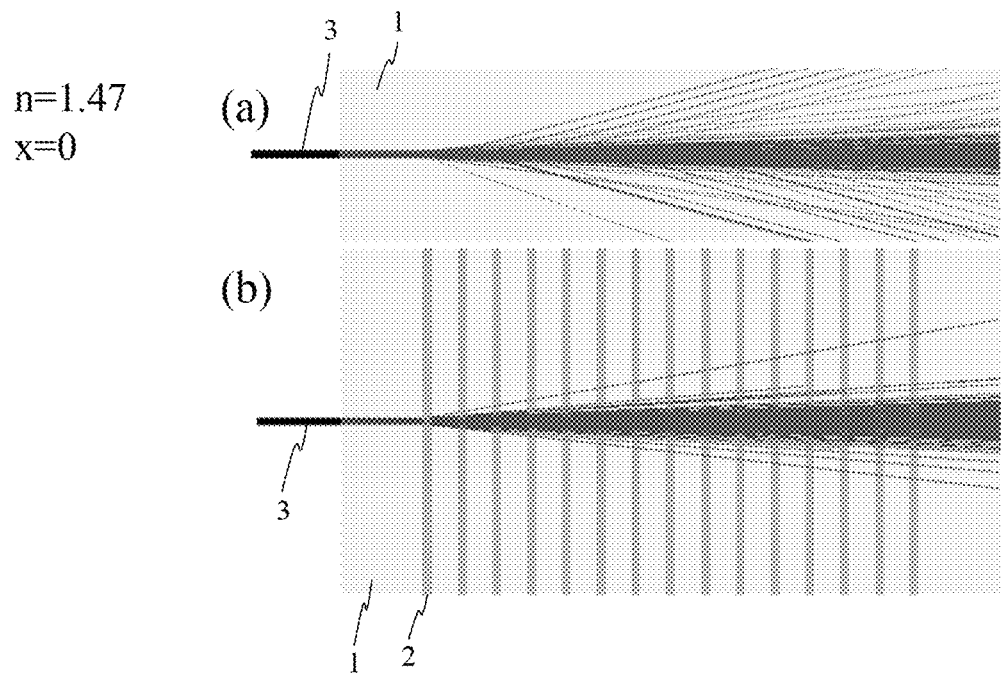
FIG. 7 illustrates the results of side-entry laser-beam ray tracing when the droplet had a refractive index of 1.47.
Figure 8:
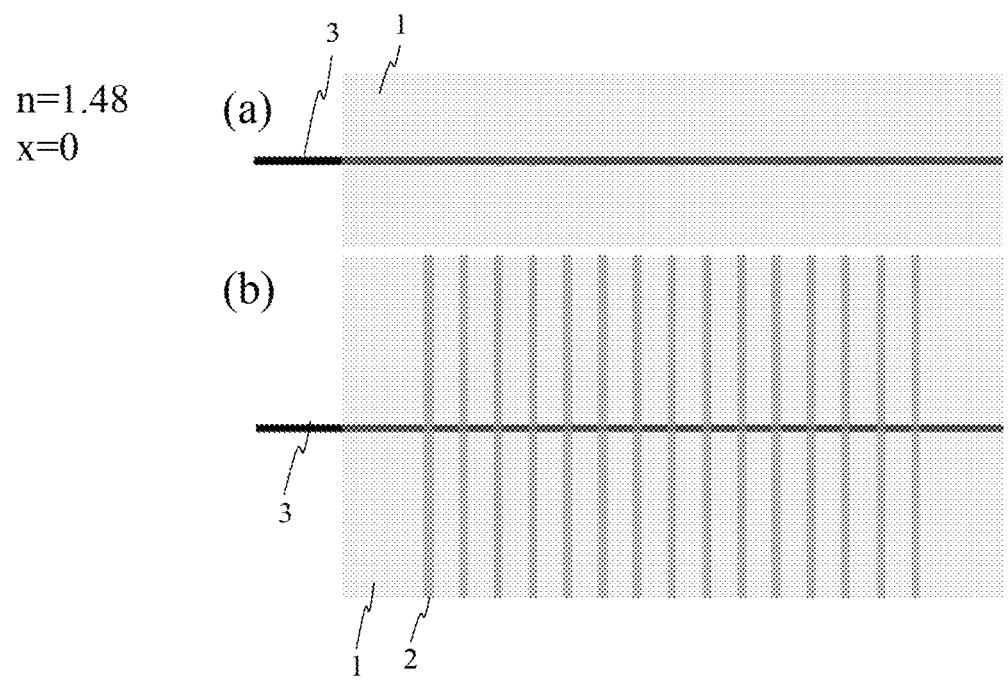
FIG. 8 illustrates the results of side-entry laser-beam ray tracing when the droplet had a refractive index of 1.48.

FIG. 7 illustrates the results in the case where, under the condition of FIG. 6 (X=0 μm), the refractive index of the droplet was increased from 1.33 to 1.47. It was learned that, as a result of the refractive index 1.47 of the droplet 4 becoming closer to the refractive index of oil 1.48, the concave lens effect of the droplet 4 is decreased; the degree of refraction of the laser beam 3 is reduced; and it becomes possible to perform laser beam irradiation and fluorescence detection for a plurality of channels by side-entry laser-beam irradiation. Further, FIG. 8 illustrates the results in the case where, under the condition of FIG. 6 (X=0 μm), the refractive index of the droplet was increased from 1.33 to 1.48. It was learned that, as a result of the refractive index 1.48 of the droplet 4 becoming matched with the refractive index of oil 1.48, the concave lens effect of the droplet 4 disappears; the refraction of the laser beam 3 is eliminated; and, similarly to when the droplet 4 is absent as in the case of FIG. 2, the laser beam 3 proceeds in the channel array without varying the diameter and central axis thereof, and is able to efficiently irradiate all of the channels 2 in a skewering manner.

Figure 10:
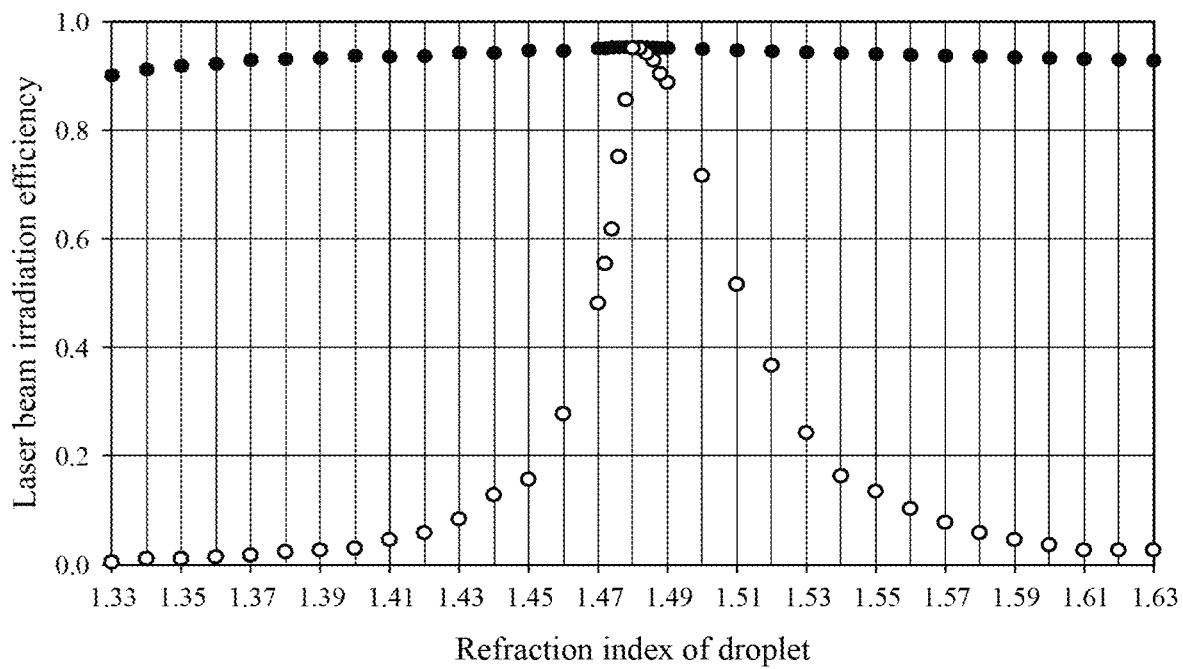
FIG. 10 illustrates changes in the laser beam irradiation efficiency for the first and the sixth channels when the refractive index of the droplet was varied.

FIG. 10 illustrates the results of detailed investigation of changes in laser beam irradiation efficiency when, including the results of FIG. 7 and FIG. 8 and under the condition of FIG. 6 (X=0 μm), the refractive index of the droplet nd was varied from 1.33 to 1.63. In this case, the refractive index of oil no was fixed at 1.48. The black-dot plot indicates the laser beam irradiation efficiency of the channel No. 1, and the blank-dot plot indicates that of the channel No. 6. The channel No. 6 is at a position spaced apart from the channel No. 1 by 1 mm, and was selected as an index for determining the availability of the side-entry laser-beam irradiation. It was learned that the laser beam irradiation efficiency for the channel No. 6 increases as the refractive index of the droplet nd approaches from 1.33 to the refractive index of oil no=1.48, becomes maximum when the refractive index of the droplet nd is matched with the refractive index of oil no=1.48, and decreases as the refractive index of the droplet nd moves past and above the refractive index of oil no=1.48. It was learned that in order to obtain the laser beam irradiation efficiency of 0.2 or more which is necessary for obtaining a practical level of fluorescence detection sensitivity, the refractive index of the droplet nd may be such that $1.46 \leq nd \leq 1.53$. That is, it was learned that the difference between the refractive index of the droplet nd and the refractive index of oil no, or nd−no, may be such that $-0.02 \leq nd-no \leq 0.05$. It was also learned that, in order to obtain the laser beam irradiation efficiency of 0.4 or more for enabling higher-sensitivity fluorescence detection, the refractive index of the droplet nd may be such that $1.47 \leq nd \leq 1.51$. That is, it was learned that the difference between the refractive index of the droplet nd and the refractive index of oil no, or nd−no, may be such that $-0.01 \leq nd-no \leq 0.03$.

Figure 11:
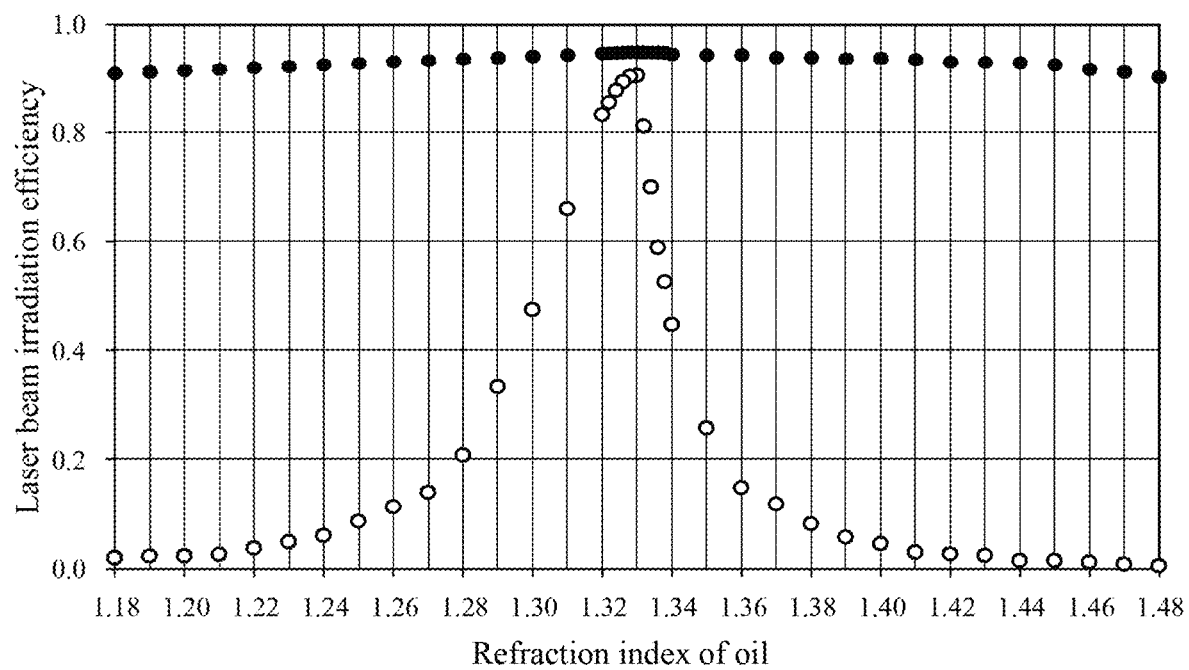
FIG. 11 illustrates changes in the laser beam irradiation efficiency for the first and the sixth channels when the refractive index of oil was varied.

FIG. 11 illustrates the results of a detailed investigation of changes in laser beam irradiation efficiency when, contrary to FIG. 10, the refractive index of oil no was varied from 1.48 to 1.18 under the condition of FIG. 6 (X=0 μm). In this case, the refractive index of the droplet was fixed at nd=1.33. The solid-dot plot indicates the laser beam irradiation efficiency of channel No. 1. The blank-dot plot indicates the laser beam irradiation efficiency of channel No. 6. It was learned that the laser beam irradiation efficiency of channel No. 6 increases as the refractive index of oil no of 1.48 becomes closer to the refractive index of the droplet nd=1.33, becomes maximum when the refractive index of oil no is matched with the refractive index of the droplet nd=1.33, and decreases as the refractive index of oil no moves past and below the refractive index of the droplet nd=1.33. It was learned that, in order to obtain the laser beam irradiation efficiency of 0.2 or more necessary for obtaining a practical level of fluorescence detection sensitivity, the refractive index of oil no may be such that $1.28 \leq no \leq 1.35$. That is, it was learned that the difference between the refractive index of the droplet nd and the refractive index of oil no, or nd−no, may be such that $-0.02 \leq nd-no \leq 0.05$. It was also learned that, in order to obtain the laser beam irradiation efficiency of 0.4 or more for enabling higher-sensitivity fluorescence detection, the refractive index of oil no may be such that $1.30 \leq no \leq 1.34$. That is, it was learned that the difference between the refractive index of the droplet nd and the refractive index of oil no, or nd−no, may be such that $-0.01 \leq nd-no \leq 0.03$.

From the results of FIG. 10 and FIG. 11, it was learned that, regardless of the refractive index of the droplet and oil, it is effective, for the implementation of side-entry laser-beam irradiation, to make the refractive index difference nd−no such that $-0.02 \leq nd-no \leq 0.05$, and more preferably to make the refractive index difference nd−no such that $-0.01 \leq nd-no \leq 0.03$. It goes without saying that it is even more preferable to eliminate the refractive index difference and make the refractive indexes of droplet and oil matched with each other.

Figure 12:
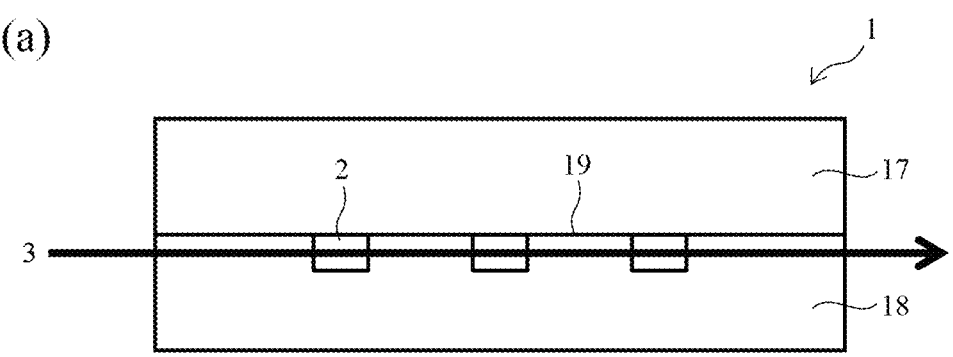
FIG. 12 illustrates configuration examples of a microchip having a multi-channel array.
Figure 12:
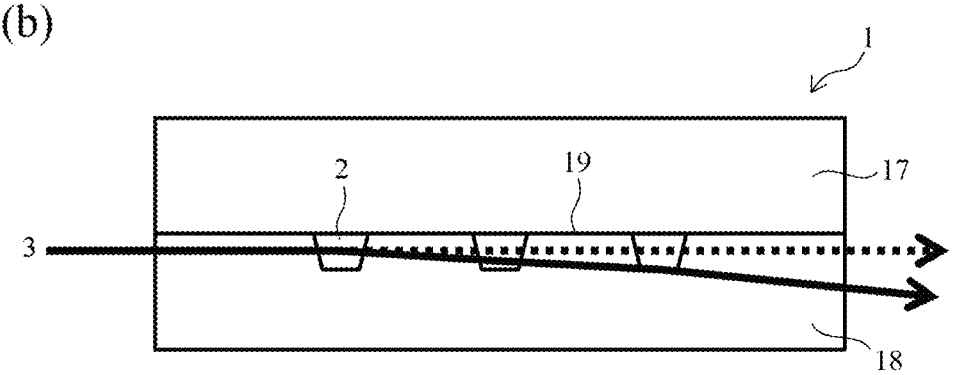
Figure 12:
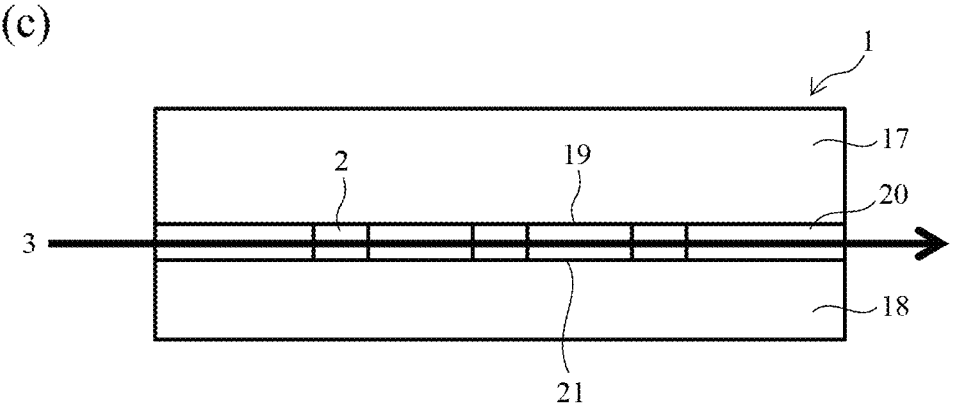

FIG. 12 illustrates configuration examples of the microchip 1 using cross sectional views perpendicular to the long axes of the respective channels 2. The material of the microchip 1 is a transparent resin, glass and the like. As illustrated in FIG. 12(a), the microchip 1 is generally fabricated by joining an upper substrate 17 having a flat surface to a lower substrate 18 having a plurality of grooves in a surface thereof at a bonding surface 19, and transforming the grooves into the channels 2. However, when the lower substrate 18 is fabricated using a mold, as in the case of resin injection molding, i.e., by a method that facilitates mass production and a decrease in manufacturing cost, it is necessary to provide a draft angle for the removal of a molded article (lower substrate 18) from the mold. Accordingly, the cross sectional shape of the channels 2 becomes trapezoidal as illustrated in FIG. 12(b), rather than square or rectangle as illustrated in FIG. 12(a). In this case, the problem has been newly discovered that the laser beam 3 entering the side surface of the microchip 1 along the array plane is subjected to refraction in the same direction by the both right and left side surfaces of the respective channels 2, and deviates from the array plane as the laser beam 3 passes through the plurality of channels 2. More specifically, when the refractive index of the interior of the respective channels 2 (droplets or oil) is smaller than the refractive index of the microchip 1, the laser beam deviates on the lower side of the array plane, as illustrated in FIG. 12(b). Conversely, when the refractive index of the interior of the respective channels 2 (droplets or oil) is greater than the refractive index of the microchip 1, the laser beam deviates on the upper side of the array plane. In either case, even if the refractive indexes of droplets and oil are matched, simultaneous irradiation of the plurality of channels 2 becomes difficult.

Figure 13:
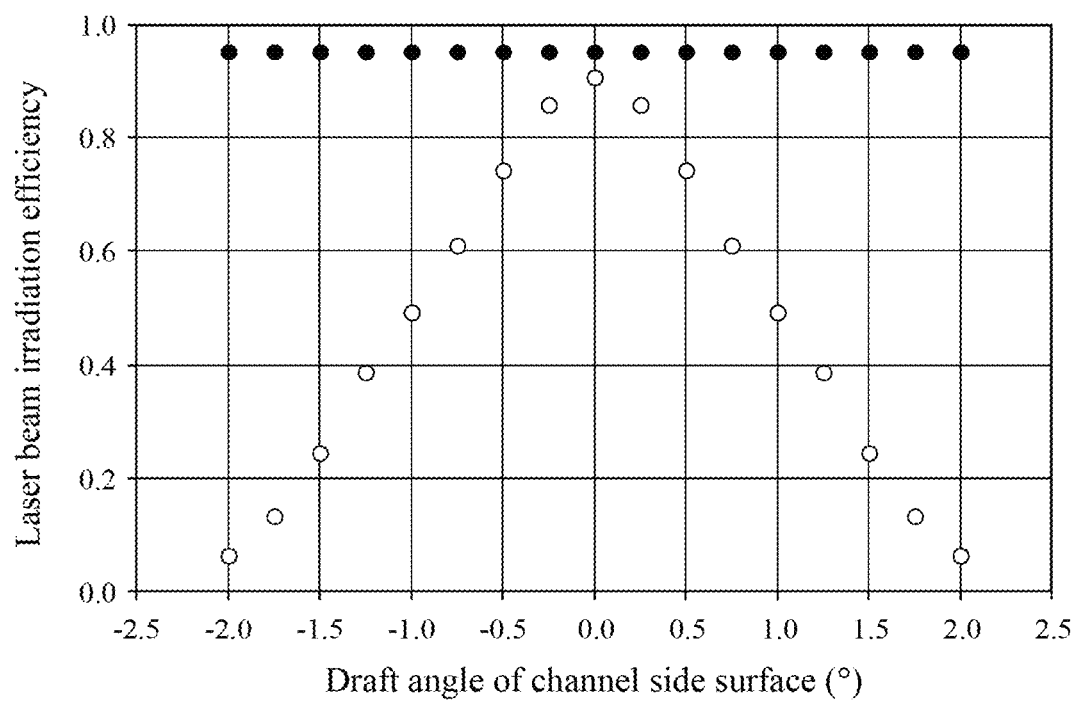
FIG. 13 illustrates the relationship between the draft angle of a channel side surface and laser beam irradiation efficiency.

FIG. 13 illustrates the results of an investigation of laser beam irradiation efficiency when the draft angle was increased from the condition of FIG. 12(a) (draft angle zero degree). It should be noted that while the refractive index of the material of the microchip remained 1.53, the refractive indexes of the droplets and oil in the channels were each 1.33 instead of 1.48. The draft angle was defined as the angle obtained by subtracting 90 degrees from the angle formed by the array plane of the plurality of channels and the side surfaces of the respective channels, or the angle obtained by subtracting 90 degrees from the angle formed by the bottom side and lateral sides of the quadrangle of the channel cross section (base angle of the trapezoid). The solid-dot plot indicates the laser beam irradiation efficiency for channel No. 1, and the blank-dot plot indicates the laser beam irradiation efficiency for channel No. 6. When the draft angle is zero degree, the laser beam irradiation efficiency is the same as the laser beam irradiation efficiency when the refractive index of oil is 1.33 in FIG. 11. In FIG. 13, the laser beam irradiation efficiency is right-left symmetric with respect to the draft angle of zero degree, and decreases as the draft angle is increased or decreased. It was learned that in order to obtain the laser beam irradiation efficiency of 0.2 or more necessary for obtaining a practical level of fluorescence detection sensitivity, the draft angle may be not more than ±1.5 degrees. It was also learned that in order to obtain the laser beam irradiation efficiency of 0.4 or more for enabling higher-sensitivity fluorescence detection, the draft angle may be not more than ±1.0 degree.

As a means for fabricating the microchip 1 illustrated in FIG. 12(a), it may be contemplated to process the grooves in the lower substrate by cutting. However, such processing method is not suitable for mass production, and has the disadvantage of high manufacturing cost. Accordingly, as illustrated in FIG. 12(c), a method has been devised by which the microchip 1 is configured from a plurality of intermediate substrates 20 in addition to the upper substrate 17 and the lower substrate 18, and joined at bonding surfaces 19, 21. Herein, the plurality of intermediate substrates 20 are respectively separate substrates that constitute the walls between adjacent two channels 2, and the walls between the channels 2 at both ends and both side surfaces of the microchip 1. Accordingly, before the joining by the bonding, it becomes relatively easy to bring the side surfaces of the respective intermediate substrates 20 closer to 90 degrees with respect to the array plane of the channels, and to polish the side surfaces of the respective intermediate substrates 20 to a mirror finish.

Example 1

The microchip 1 of glass material was fabricated according to the configuration of FIG. 12(c). Fifteen channels 2 were arrayed on the same plane at the intervals of 200 µm in the laser beam irradiation position. The cross section of the respective channels 2 was a square with sides of 50 µm, and the angle of both side surfaces with respect to the array plane was kept at 90±0.5 degrees. With respect to each of 15 kinds of samples, after a total volume of 20 microliter was divided into about 600 thousand droplets with a volume of 34 picoliters in oil, PCR was performed, and, with the droplets being lined up single file, the droplets and oil for each sample were introduced into each of the 15 channels 2 and caused to flow by vacuum aspiration. In this case, the droplet size was 40 µm in diameter assuming that the droplet was spherical.

Herein, in light of the above analysis, in order to perform the detection by side-entry laser-beam irradiation effectively, it is necessary to make the difference between the refractive index of the droplet nd and the refractive index of oil no, or nd−no, $-0.02 \leq nd-no \leq 0.05$ and preferably $-0.01 \leq nd-no \leq 0.03$. In the present example, for the oil, the silicon oil KF-96L-0.65cs from Shin-Etsu Chemical Co., Ltd. having a refractive index of 1.375 was used. On the other hand, in the droplets, 25% of sucrose was included together with a PCR reagent to adjust the refractive index to be matched with the refractive index of oil at 1.375. Generally, mixing of sucrose in PCR solution is often done, and is believed to not hinder PCR.

In the present example, the amount of genetic mutation at one location or three locations in genomes included in each sample is absolutely quantitated. In the case of genetic mutation quantitation at one location, amplification by PCR was caused when a genetic mutation of interest existed in each droplet, and fluorescence with a main wavelength band of from 560 to 580 nm was emitted by laser beam irradiation. On the other hand, in the case of genetic mutation quantitation at three locations, PCR was performed with respect to the three locations in parallel, amplification was caused independently when the respective genetic mutation existed, and different fluorescence was emitted. That is, the amplification at the three locations can be identified with three colors of fluorescence. The three colors of fluorescence had main wavelength bands of from 520 to 540 nm, from 560 to 580 nm, and from 600 to 620 nm.

The droplets that do not include any genetic mutations produce relatively weak fluorescence or scattered light. Accordingly, it is possible to count the number of the droplets by detecting and discriminating them from the droplets that emit relatively strong fluorescence by the amplification. In order to detect the droplets with higher sensitivity, a difference in Raman scattered light due to laser beam irradiation of the oil and droplets in the three colors of wavelength bands may be utilized. Because the intensity ratios of Raman scattered light in the three colors of wavelength bands differ from those of the respective fluorescence, it is possible to accurately discriminate Raman scattered light from fluorescence.

Figure 14:
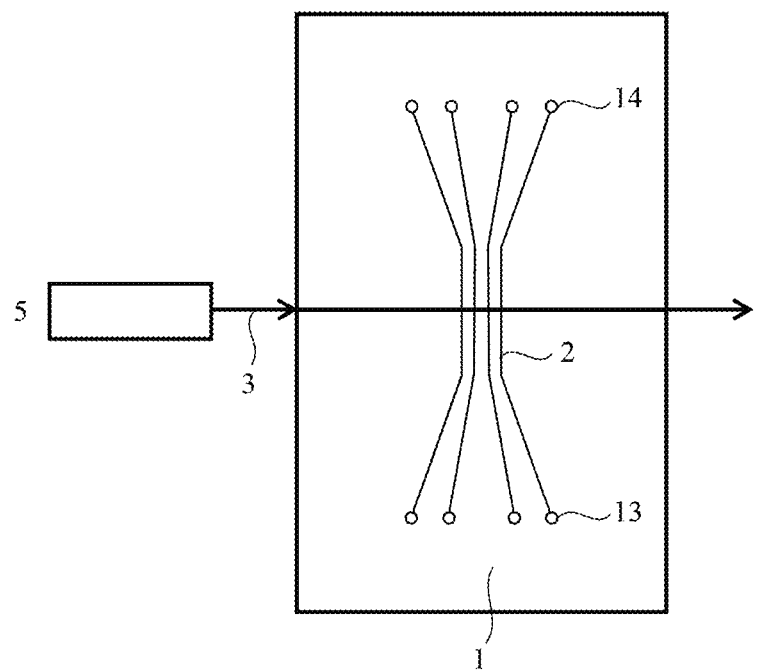
FIG. 14 schematically illustrates configuration examples of a microchip having a multi-channel array.
Figure 14:
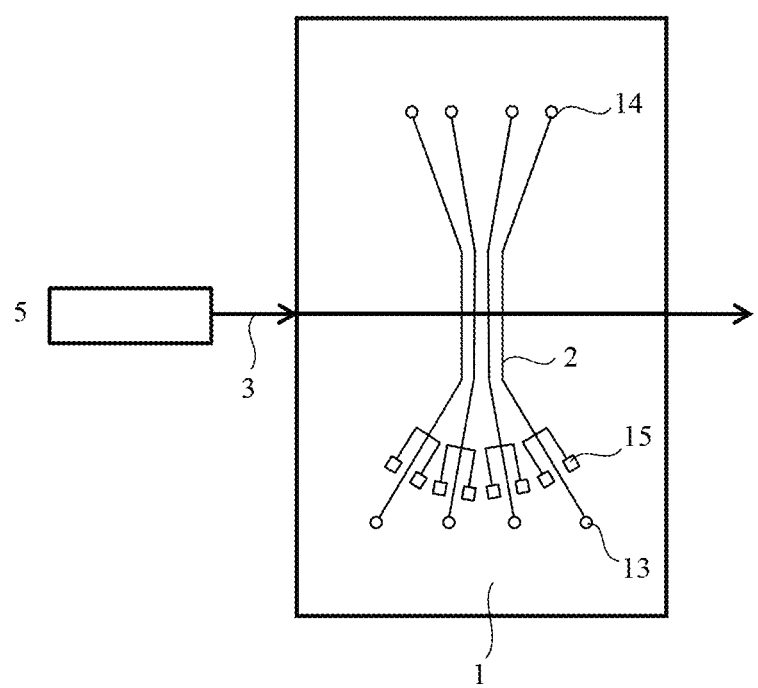

FIG. 14(a) is a schematic frontal view illustrating an example of the microchip 1 having a multi-channel array. For sake of simplicity, only four channels 2 are drawn. At both ends of the respective channels 2, entries 13 and exits 14 are provided, and the flow of droplets and oil was in the direction from the entries 13 to the exits 14. In the present example, the microchip 1 constitutes a flow path section of a light detection device, and a line of flow is formed in each of the channels 2. The laser beam 3 emitted from the laser light source 5 is introduced via a side surface of the microchip 1 along the array plane of the channels 2 vertically to the longitudinal direction of the respective channels. The channels 2 have an array interval that is smaller around the laser-beam irradiation position and that is greater around the entries 13 and exits 14 at the ends. The laser light source 5 and the area of the microchip 1 that is irradiated with the laser beam 3 constitute a laser beam irradiation section.

FIG. 14(b) is a schematic diagram of a configuration example in which, in order to improve detection accuracy by increasing the intervals of droplets flowing in the respective channels 2 around the laser beam irradiation position, the respective channels 2 are provided with a mechanism for adding oil between the entries 13 and the laser beam irradiation position. For each channel 2, oil is introduced from oil entries 15 at two locations into the respective channels 2 from two directions. The added oil is discharged via the exits 14 together with the droplets and oil introduced via the entries 13.

Figure 15:
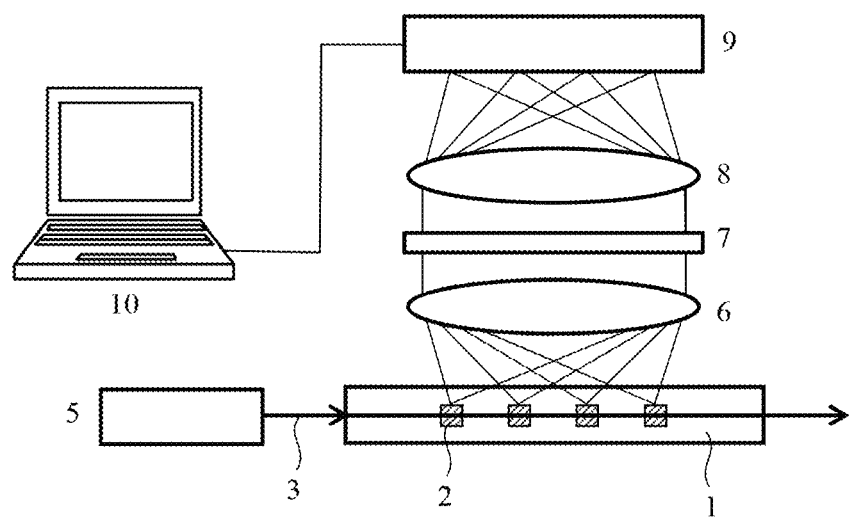
FIG. 15 diagrammatically illustrates configuration examples of laser irradiation and fluorescence detection sections of the microchip.
Figure 15:
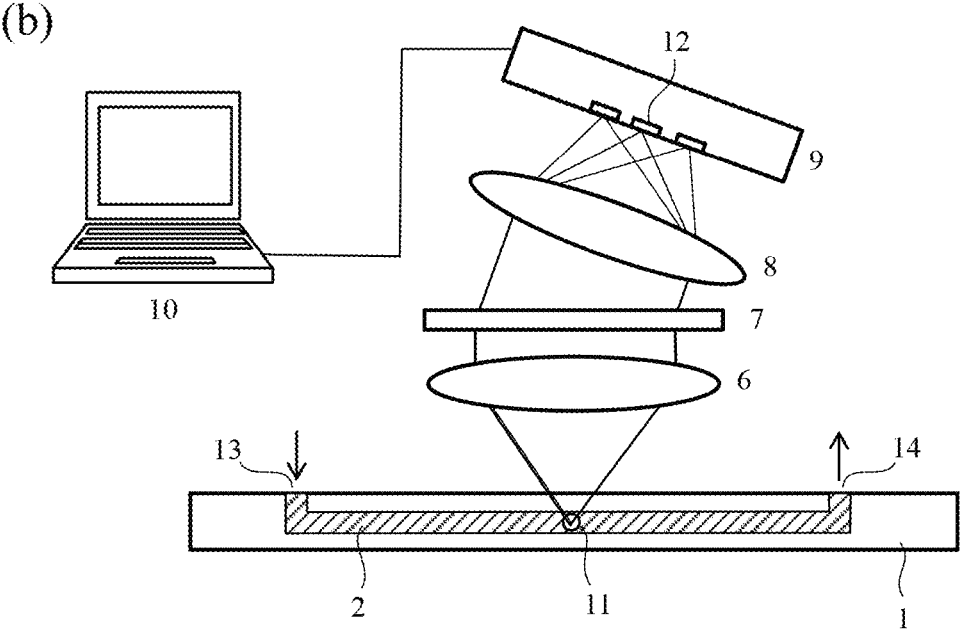

FIG. 15 schematically illustrates the overall configuration of the light detection device, and illustrates a configuration example of the laser beam irradiation section and a light detection section of the microchip 1. In the light detection section, the light emitted separately from the droplets in each line of flow due to the irradiation of the laser beam 3 is detected from the vertical direction with respect to the array plane. FIG. 15(a) is a view from a direction parallel with the long axes of the respective channels 2. FIG. 15(b) is a view from a direction perpendicular to the long axes of the respective channels 2.

The laser beam 3 emitted from the laser light source 5 at a wavelength of 505 nm, with an output of 10 mW, and with a diameter of 40 μm, enters via a side surface of the microchip 1 along the array plane of the plurality of channels 2, and irradiates the respective channels 2. When the droplets flowing in the respective channels 2 cross the laser beam 3, they are excited by the laser beam 3 and emit fluorescence according to PCR. That is, if the droplets include target genetic mutations, the droplets emit strong fluorescence; if not, the droplets only emit weak fluorescence. The fluorescence emitted from the respective channels 2 is detected by a fluorescence detection optical system. Specifically, the fluorescence emitted from the respective channels 2 is turned into a parallel light bundle by a common collection lens 6, passes through a filter and diffraction grating 7, and imaged by an imaging lens 8 on a sensor plane of a sensor 9. The filter is provided to block the wavelengths of the laser beam 3 that would provide background light in fluorescence detection, and the diffraction grating as a wavelength dispersion element is provided to disperse the wavelengths of the fluorescence for multicolor detection. Herein, if the multicolor detection of fluorescence is not necessarily required, as in the case of genetic mutation quantitation at one location, the diffraction grating in the filter and diffraction grating 7 may be omitted. In the following, the case of multicolor detection will be described. As illustrated in FIG. 15(a), because the fluorescence emitted from different channels 2 is imaged at different positions on the sensor plane of the sensor 9, the fluorescence from different channels 2 can be independently detected. On the other hand, as illustrated in FIG. 15(b), the fluorescence emitted from a light emitting point 11 of each channel 2 is imaged after being wavelength-dispersed in the longitudinal direction of the respective channel 2, i.e., in a direction perpendicular to the optical axis of the laser beam 3, thus allowing the independent detection of the fluorescence of each wavelength.

Preferably, the collection lens 6 and the imaging lens 8 each may comprise a combination lens in order to reduce the influence of aberration and increase imaging performance. It may be effective to use commercially available camera lenses for single-lens reflex cameras, or objective lenses for microscopes. The collection lens 6 and the imaging lens 8 may be lenses of the same or different specifications.

In conventional capillary DNA sequencers and the like, the fluorescence emitted from a plurality of capillaries is detected by similar fluorescence detection optical systems where a two-dimensional CCD sensor or CMOS sensor may be used as the sensor 9. A similar two-dimensional sensor may be used in the present example; however, as the flow speed of droplets increases, the imaging speed may fail to catch up, resulting in an increase in the number of droplets that cannot be detected. Accordingly, in the present example, instead of a two-dimensional sensor, a plurality of 1-dimensional line sensors 12 are disposed. Generally, in two-dimensional sensors, sensor elements are arrayed two-dimensionally in a row direction and a column direction, where data acquisition including AD conversion is performed with respect to the sensor elements arrayed 1-dimensionally in the row direction at once. This step is successively shifted in the column direction to perform data acquisition for all of the sensor elements. Accordingly, compared with the data acquisition time for a 1-dimensional sensor, the data acquisition time for a two-dimensional sensor may be multiplied by the number of columns, i.e., by a factor of several thousands, independently from the exposure time. In the present example, as illustrated in FIG. 15(b), three line sensors 12 are disposed for respectively detecting the three wavelength bands of 520 to 540 nm, 560 to 580 nm, and 600 to 620 nm. The example is arranged so that it is possible not only to perform data acquisition including AD conversion with respect to the respective sensor elements in each line sensor at once, but also to perform the data acquisition with respect to the respective line sensors in parallel. The configuration enables high speed data acquisition at 100 kHz with respect to all of the sensor elements constituting each of the line sensors 12. In this way, it becomes possible to perform multicolor detection for all of the droplets that flow in the respective channels 2 at 1 kHz, that is, the droplets passing through the laser beam 3 at the rate of as many as one thousand per second.

A data processing unit 10 analyzes data detected by the sensor 9 to derive, with respect to the 15 kinds of samples, the absolute quantity of target genetic mutations at three locations, and its ratio to a total number of genomes. While in the foregoing example, three color detection is performed for independent and absolute quantitation of target genetic mutations at three locations, generally N-color detection may be performed for independent and absolute quantitation of target genetic mutations at N locations (N=1, 2, 3, . . . ). Alternatively, in the case of M-color detection (M=2, 3, 4, . . . ) where M≤N, it is possible to perform independent and absolute quantitation of target genetic mutations at N locations (N=3, 4, 5, . . . ) by varying the M-color intensity ratios for target genetic mutations at N locations.

Figure 16:
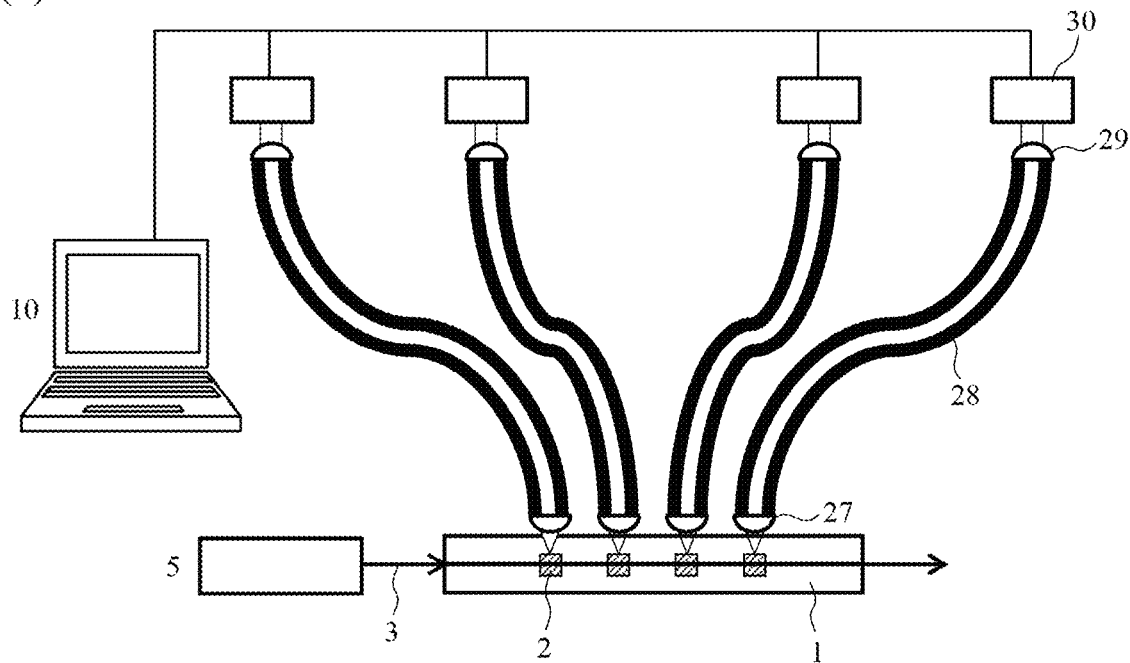
FIG. 16 schematically illustrates modifications of the fluorescence detection section.
Figure 16:
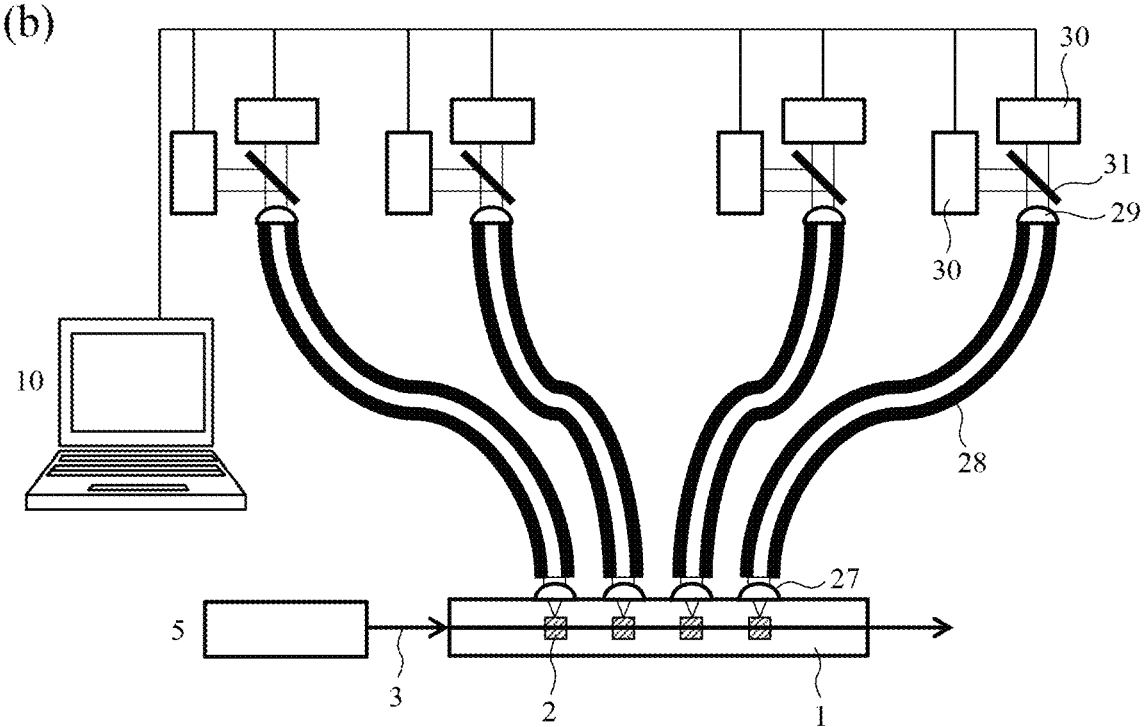
Figure 17:
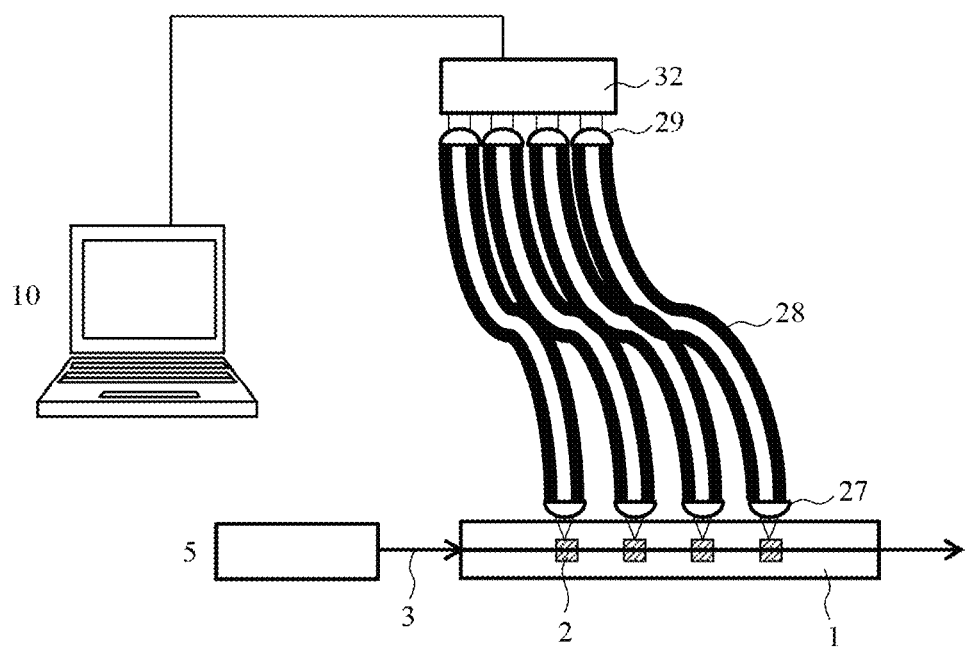
FIG. 17 schematically illustrates a modification of the fluorescence detection section.

As the sensor 9 in FIG. 15, it may also be effective to use a photomultiplier array 32 illustrated in FIG. 17. In this way, the fluorescence emitted from the plurality of channels 2 can be subjected to multicolor detection simultaneously and at higher speed and sensitivity. FIG. 16(a) is a schematic diagram of a modification of the configuration of the laser irradiation and fluorescence detection sections of the microchip 1 illustrated in FIG. 15. In the present example, a laser beam laterally enters multiple channels arrayed in the microchip, and the light emitted from the multiple channels is detected using respectively different optical fibers and different photomultipliers. By using the photomultipliers 30 as light detectors instead of the line sensors 12, fluorescence detection can be performed at higher speed and higher sensitivity than is possible with the light detection device illustrated in FIG. 15. Because the size of the photomultipliers 30 is generally greater than the line sensors 12, adopting an optical system similar to that of FIG. 15(b) is difficult. Accordingly, the light emitting points and the light detectors are connected by optical fibers 28. The light emitted from the respective channels 2 by the irradiation of the laser beam 3 is collected by individual collection lenses 27, and caused to enter one end of the optical fibers 28. The emitted light exiting the other end of the optical fibers 28 is again respectively collected by the individual collection lenses 29, caused to enter the photomultipliers 30 via a filter, and detected at high speed and with high sensitivity. The present configuration does not include a spectroscopic means and is therefore effective when performing single color detection, as in the case of genetic mutation quantitation at one location. Herein, while it is possible to adjust in advance the relative positions of the individual collection lenses 27 and the one end of the respective optical fibers connected therewith, it would be bothersome to adjust the relative positions of the individual collection lenses 27 and the respective channels 2 in different microchips 1. Accordingly, each microchip 1 may be provided with a guide so as to facilitate the adjustment of the relative positions of the individual collection lenses 27 and the respective channels 2.

FIG. 16(b) is a schematic diagram of a light detection device which is a further modification of FIG. 16(a) configured to enable multicolor detection of exit light from the respective optical fibers. First, the individual collection lenses 27 are integrated not with the optical fibers 28 but with the microchip 1, and the relative positions of the respective channels 2 and the individual collection lenses 27 are adjusted in advance. The structure can be easily obtained by injection molding and the like in the process of fabricating the microchip 1. Generally, the relative positions between the respective channels 2 and the individual collection lenses 27 with higher accuracy are required than the relative positions between the individual collection lenses 27 and the one end of the optical fibers 28. Accordingly, the configuration of FIG. 16(b) facilitates the overall position adjustment. In FIG. 16(b), in order to perform multicolor detection, the emitted light exiting the other end of each of the optical fibers 28 is collected by the individual collection lenses 29, divided by dichroic mirrors 31, and then respectively detected by the different photomultipliers 30. In the example illustrated in FIG. 16(b), two color detection is performed with respect to each emitted light. It goes without saying, however, that multicolor detection for three or more colors can be handled by similar configurations.

FIG. 17 is a schematic diagram of an example of a light detection device in which the exit light from the plurality of optical fibers 28 is respectively detected not by the different photomultipliers 30 as in FIG. 16, but by a single photomultiplier array 32 comprising a plurality of photomultipliers integrated together. Herein, the 8-channel linear array PMT (H9530) available from Hamamatsu Photonics K.K. is used. In this sensor, eight detection areas measuring 2.0×2.5 mm are arrayed at intervals of 2.8 mm. The sensor is capable of detecting light entering each detection area respectively independently at the sensitivity and speed comparable to those of the 1-channel photomultipliers 30. The light exit ends of the respective optical fibers 28 are arrayed at intervals of 2.8 mm. The exit light from the respective optical fibers 28 is collected by the individual collection lenses 29, caused to enter the different detection areas, and subjected to high sensitivity detection at 1 MHz. The 1 MHz detected data are subjected to integrating processing by the data processing unit 10 for further sensitivity improvement. The present configuration does not include a spectroscopic means and is therefore effective for performing single color detection, as in the case of genetic mutation quantitation at one location.

Figure 18:
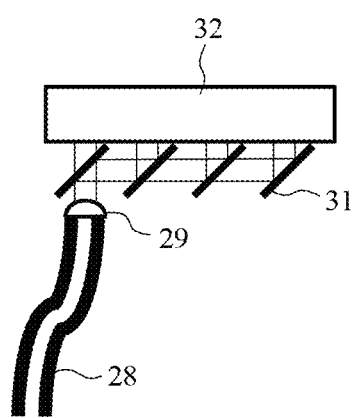
FIG. 18 schematically illustrates a modification of the fluorescence detection section.

FIG. 18 is a schematic diagram of an exemplary development of the configuration of FIG. 17 for multicolor detection. The configuration from the laser light source 5 to the individual collection lenses 29 is the same as that of FIG. 17. FIG. 18 is a view from the right side of FIG. 17, and only shows the light exit end of the optical fiber 28 arrayed at the right-most side of FIG. 17. The exit light from each of the optical fibers 28 is turned into a parallel light bundle by the individual collection lenses 29, and then divided by four types of dichroic mirrors 31 into four parallel light bundles of four colors proceeding in the same direction. Herein, each of the dichroic mirrors 31 may comprise a single common member for each of the optical fibers 28. The photomultiplier array 32 may be the 64-channel, two-dimensional array PMT (H7546) available from Hamamatsu Photonics K.K. In this sensor, a total of 64 detection areas each measuring 2.0×2.0 mm are disposed in an 8×8 array at intervals of 2.3 mm. Of the two-dimensional array, one dimension is set for the direction in which the plurality of optical fibers 28 are arrayed, and the other dimension is set for the direction in which the parallel light bundles are divided by the dichroic mirrors 31, whereby the fluorescence emitted from the plurality of channels 2 can be independently subjected to four color, high sensitivity detection at 1 MHz. Herein, each divided parallel light bundle derived from the light emitted from the plurality of channels 2 is not necessarily required to enter one detection area, and may instead straddle a plurality of detection areas. In that case, it is effective to perform integrating processing in the data processing unit 10 on the detection signals from the plurality of detection areas into which the parallel light bundle has entered.

Figure 19:
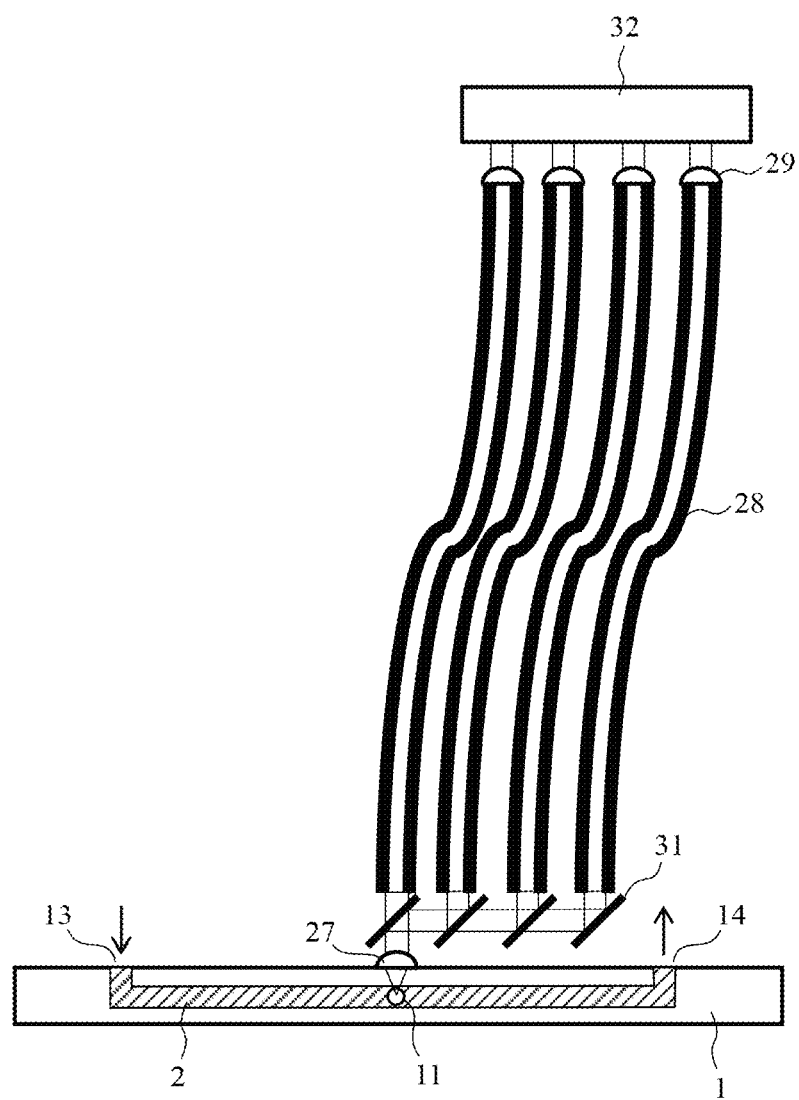
FIG. 19 schematically illustrates a modification of the fluorescence detection section.

FIG. 19 is a schematic diagram of a modification of FIG. 18, illustrating a configuration example of a light detection device in which the order of the optical fibers 28 and the dichroic mirrors 31 in FIG. 18 is reversed. FIG. 19, similarly to FIG. 18, is a view from the direction of the axis of laser beam irradiation, and includes the microchip 1. The fluorescence emitted from the light emitting point 11 that is the laser beam irradiation position of each of the respective channels 2 is collected by the individual collection lenses 27, divided by the four types of dichroic mirrors 31 into four parallel light bundles of four colors proceeding in the same direction, and each caused to enter a different one end of the optical fibers 28. The light exiting the other end of each of the optical fibers 28 is again collected by the individual collection lenses 29, caused to enter the respective detection areas of the photomultiplier array 32, and detected at high speed and with high sensitivity. In the configuration of FIG. 19, the number of necessary optical fibers 28 is increased by a factor of four compared with FIG. 18. The configuration, however, provides the advantage in that the alignment of the light exit end of the optical fibers 28 and the detection areas of the photomultiplier array 32 is facilitated.

Figure 20:
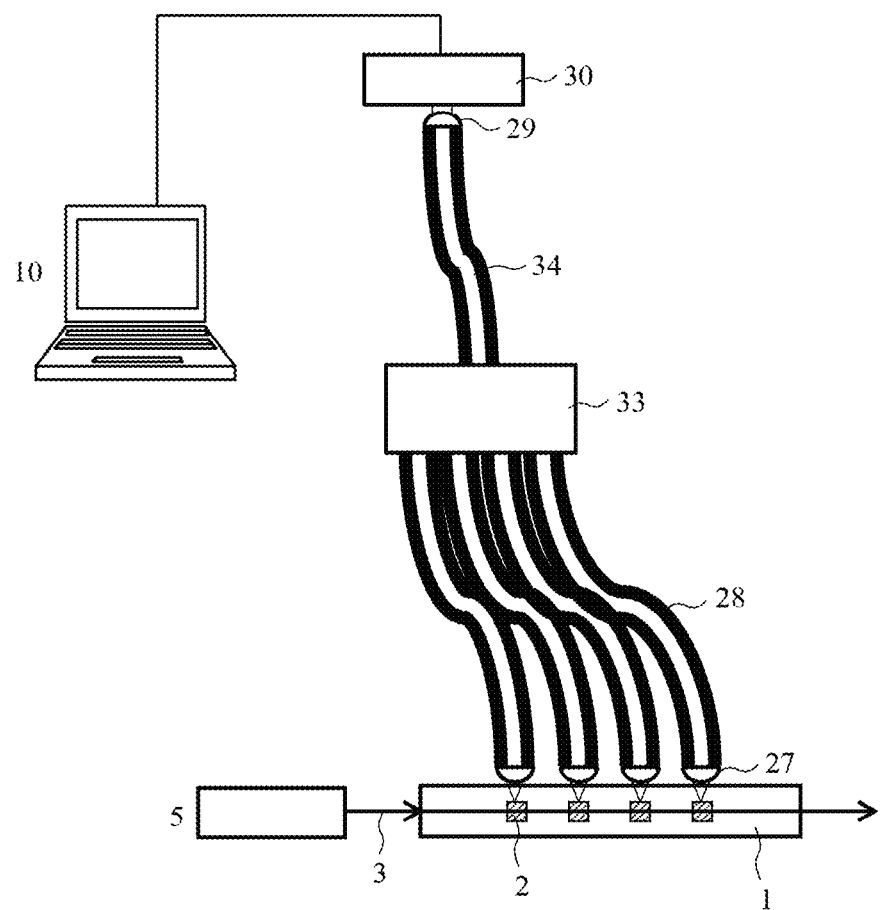
FIG. 20 schematically illustrates a modification of the fluorescence detection section.

FIG. 20 is a schematic diagram of a configuration example of a light detection device in which, in order to reduce device cost compared with FIG. 16, the light emitted from the plurality of channels 2 is independently detected by a single photomultiplier 30. The plurality of optical fibers 28 are consolidated into a single consolidated optical fiber 34 via an optical fiber switch 33, and the exit light from the consolidated optical fiber 34 is collected by an individual collection lens 29, and then detected by a photomultiplier 30. The optical fiber switch 33 has the function of optically connecting only one of the plurality of optical fibers 28 to the consolidated optical fiber 34, and allowing the transmission light in the optical fiber 28 to be transmitted to the consolidated optical fiber 34. Herein, the plurality of optical fibers 28 are connected in sequence repeatedly at intervals of 0.1 millisecond (10 kHz), thereby allowing the emitted light from the plurality of channels 2 to be detected by the single photomultipliers 30 by time division.

Examples of the mechanism of the optical fiber switch 33 include a scheme in which the relative positions of the plurality of optical fibers 28 and the single consolidated optical fiber 34 are mechanically slid to switch their mutual optical connections, and a scheme in which the optical fiber 28 that connects the consolidated optical fiber 34 is switched by mechanically controlling the angle of micromirrors that respectively reflect the exit light from the plurality of optical fibers 28. Herein, as the optical fiber switch 33, a liquid crystal shutter array is used which is capable of performing stable switching at higher speed. The exit light from the respective optical fibers 28 is turned into parallel light bundles by individual collection lens, and the parallel light bundles are respectively caused to enter different optical fibers via individual liquid crystal shutters. The optical fibers are consolidated into the consolidated optical fiber 34 in a subsequent stage. The liquid crystal shutters are able to control their opening and closing by electrical control at high speed, so that the optical connection between the respective optical fibers 28 and the consolidated optical fiber 34 can be easily switched at high speed. The optical fiber switch does not require a mechanical operation, and therefore provides high stability. The switching of the optical fibers 28 by the optical fiber switch 33 and signals detected by the photomultipliers 30 are associated with each other in the data processing unit 10. Accordingly, the light emitted from the respective channels 2 can be independently detected at high speed and with high sensitivity.

In the configuration examples of the light detection device illustrated in FIG. 15 to FIG. 20, the object of interest has been the light emitted by laser irradiation of the plurality of channels 2 configured in the microchip 1. However, the light detection device is not limited to such object of interest, and may provide similar effects with respect to an arbitrary object in which a plurality of light emitting points are arrayed. In the present example, the light detection device is specifically concerned with the case in which droplets and oil are flowed in respective channels, where fluorescence is emitted from the droplets by laser irradiation. However, the uses of the light detection device are not limited to such cases. Similar effects can be obtained when the light emitted from a plurality of light emitting points is detected at high speed and with high sensitivity, particularly in the case of multicolor detection.

Example 2

In the present example, in the light detection device, a plurality of lines of flow are configured not inside a microchip but in the inner spaces of a plurality of capillaries. That is, in the present example, a flow path section of the light detection device is configured by a plurality of capillaries aligned and arrayed on an array plane.

Figure 21:
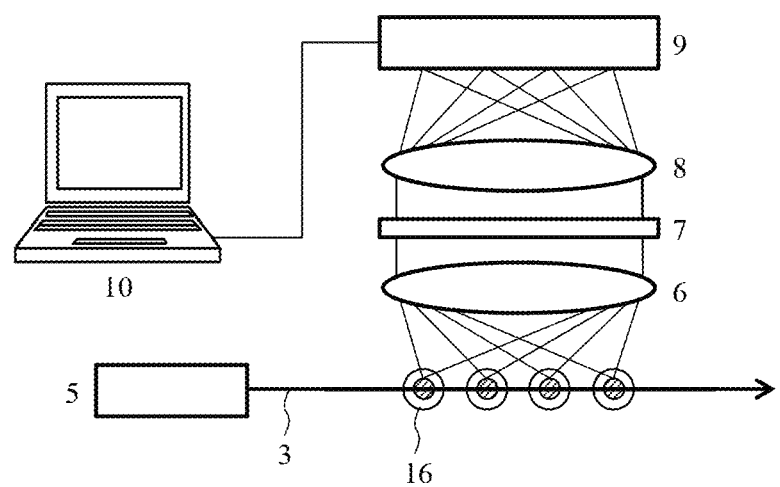
FIG. 21 diagrammatically illustrates a light detection device provided with a multicapillary arrayed in midair.

FIG. 21 is a schematic diagram of the light detection device according to the present example. FIG. 21 illustrates a configuration example of the laser beam irradiation section and the fluorescence detection section for a plurality of capillaries 16, and corresponds to FIG. 15(*a*) of Example 1. Unless specifically noted, the configuration and method are similar to those of Example 1. Twenty-four capillaries 16 with a refractive index of 1.46 and made of quartz glass are arrayed in the air on the array plane. In the capillaries 16, lines of flow are formed in which a plurality of droplets dispersed in oil are moved along a linear flow. The capillaries 16 are denoted by capillary numbers No. 1 to No. 24 from the left side in sequence. The capillaries had an outer diameter of 100 to 323 µm, an inner diameter of 10 to 50 µm, and an array interval in the laser beam irradiation position of 150 µm or 370 µm. In the above ranges, effective conditions for side-entry laser-beam irradiation were considered. In the present example, the laser beam irradiation section is configured from the laser light source 5 and an area in which the plurality of capillaries 16 are irradiated with the laser beam 3. The light detection section is disposed in a vertical direction with respect to the array plane of the capillaries.

With respect to each of 24 kinds of samples, a total volume of 20 microliter was divided into about 600 thousand droplets with a volume of 34 picoliters in oil, and then PCR was performed. The droplets and oil for each sample were introduced into each of the 24 capillaries 16 with the droplets being lined up single file by vacuum aspiration, and caused to flow. In this case, the droplet size was 40 µm in diameter assuming that the droplet was spherical. The device was simplified by adopting a configuration in which one ends of the 24 capillaries were directly and respectively inserted into the 24 kinds of sample solutions after PCR, where suctioning was performed from the other ends.

Herein, in light of the above analysis, in order to perform the detection by side-entry laser-beam irradiation effectively, the difference between the refractive index of the droplet nd and the refractive index of oil no, or nd−no, needs to be −0.02≤nd−no≤0.05 and preferably −0.01≤nd−no≤0.03. In the present example, the oil used was Fluorinert FC-43 from 3M with a refractive index of 1.29 into which trace amounts of high refractive index substance was mixed to adjust the refractive index to 1.33. For the droplets, a standard PCR solution with a refractive index of 1.33 was used to match the refractive index of oil. In order to stabilize the droplets in oil, 1% EA-surfactant from RainDance Technologies was mixed in the oil.

Figure 22:
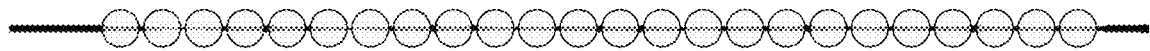
FIG. 22 illustrates the results of side-entry laser-beam ray tracing in a multicapillary, when the inner diameter was fixed at 50 μm and the outer diameter was varied.
Figure 22:
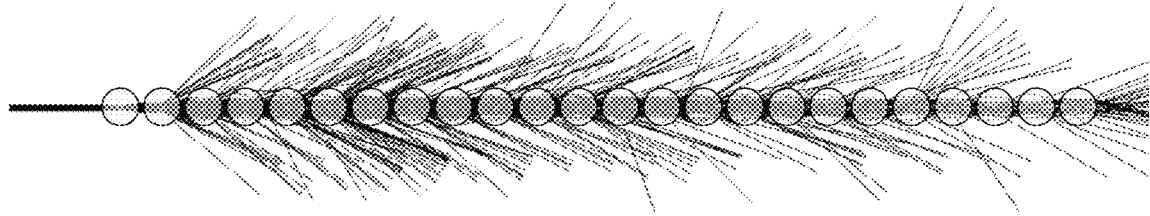
Figure 22:
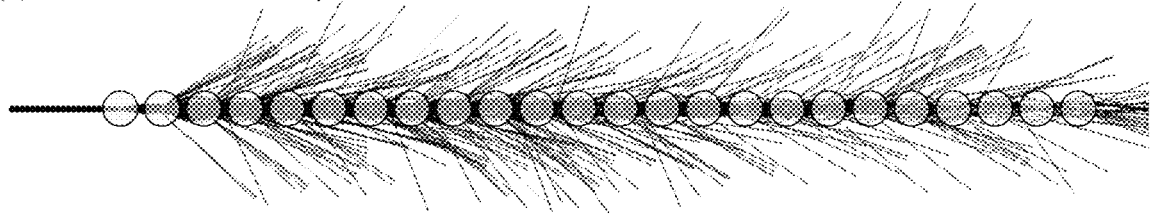
Figure 22:
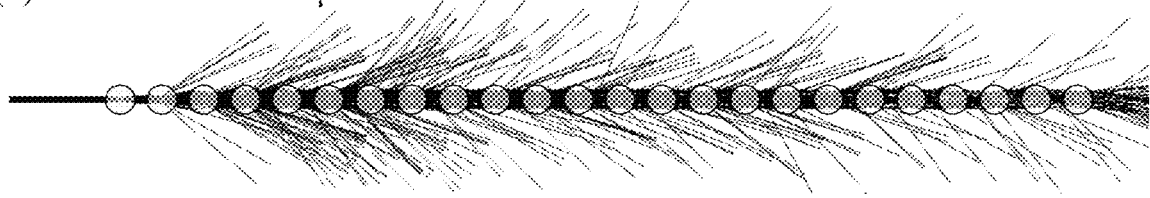
Figure 22:
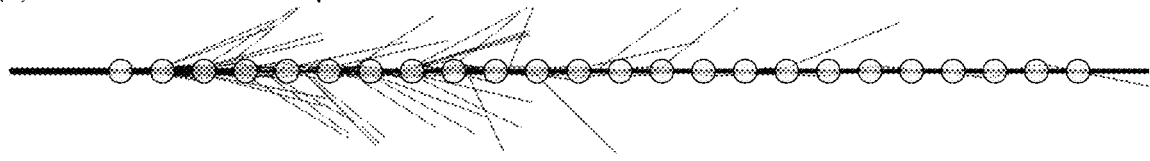
Figure 22:
Figure 25:
FIG. 25 illustrates the results of side-entry laser-beam ray tracing in a multicapillary, when the outer diameter was fixed at 150 µm and the inner diameter was varied.
Figure 25:
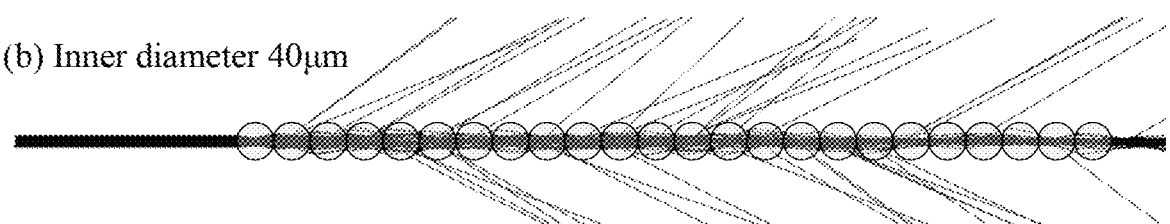
Figure 25:
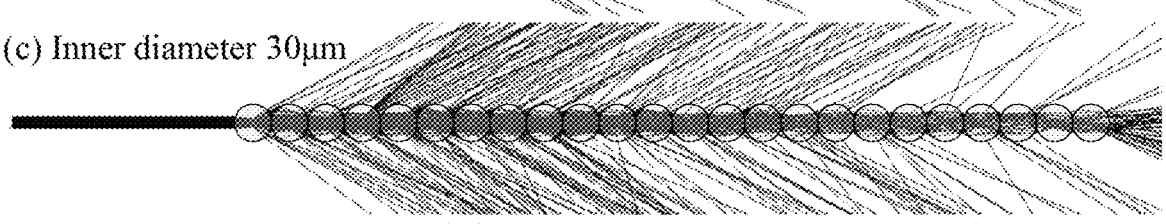
Figure 25:
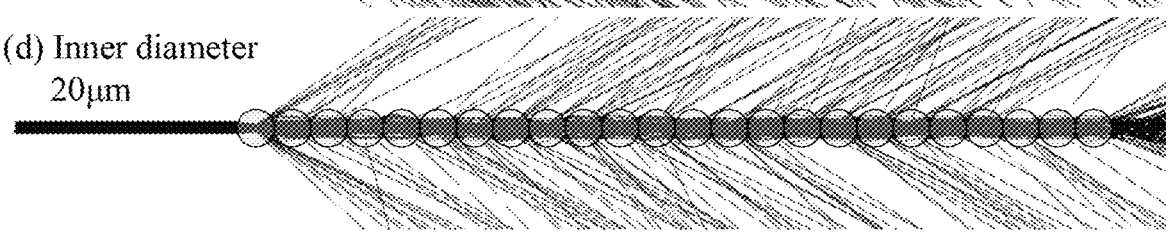
Figure 25:
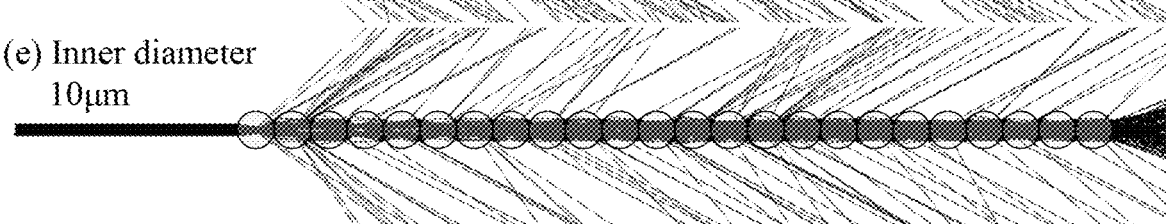
Figure 28:
FIG. 28 illustrates the results of side-entry laser-beam ray tracing in a multicapillary, when the outer diameter was fixed at 100 µm and the inner diameter was varied.
Figure 28:
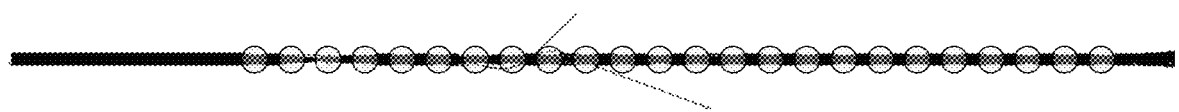
Figure 28:
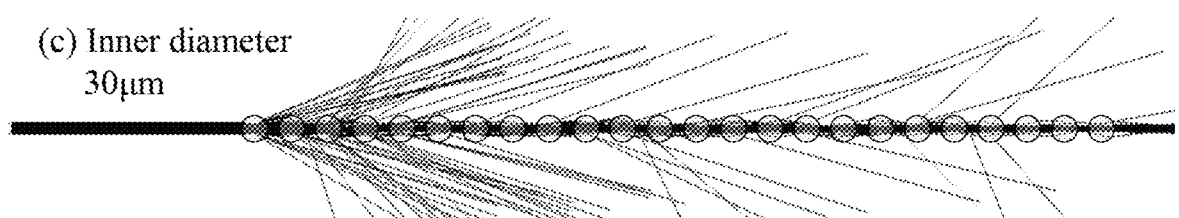
Figure 28:
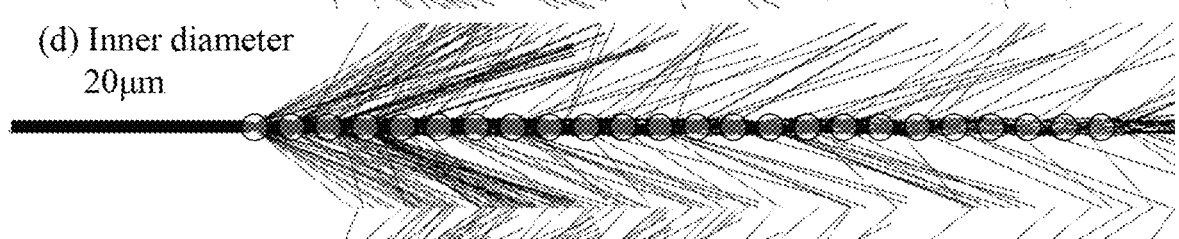
Figure 28:
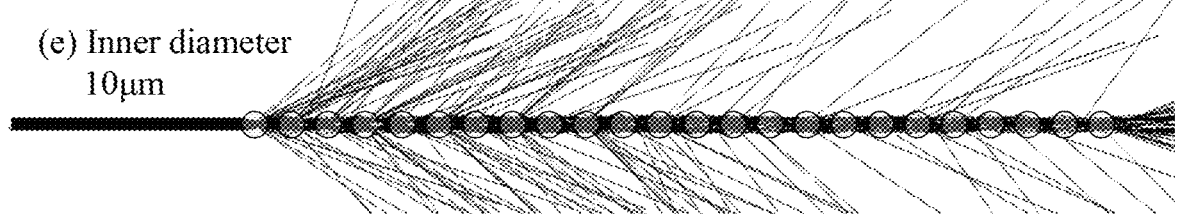

With respect to the side-entry laser-beam irradiation of the 24-capillary array in midair, laser-beam ray-tracing simulations similar to FIG. 2 to FIG. 8 were performed. FIG. 22, FIG. 25, and FIG. 28 illustrate the results of the laser-beam ray-tracing simulations, where the capillaries are drawn with outlines indicating the outer diameter of each capillary for sake of clarity.

FIG. 22(a) illustrates the result in the case of an outer diameter of 323 μm, an inner diameter of and an array interval of 370 μm, where the capillaries were internally filled with a solution with a refractive index of 1.41. The side-entry laser beam had a diameter of 50 μm. The conditions are equivalent to those of commercially available capillary DNA sequencers, and the multiple-laser-beam-focusing technique is functioning to enable the laterally entering laser beam to irradiate and penetrate through all of the capillaries in a skewering manner. The result shown is that in the case of the side-entry laser beam entered from the left side of the capillary array. The result can extrapolate a result in a case where the laser beam is divided into two beams each with 50% laser beam intensity, and the two beams entered from both the right and the left sides of the capillary array. Therefore, the laser beam irradiation efficiency of each capillary, when the side-entry laser-beam irradiation entered from both sides of the capillary array, is indicated by a blank-triangle plot in FIG. 23.

As illustrated in FIG. 22(a), even when the multiple-laser-beam-focusing technique is functioning, the laser beam is subjected to reflection loss at the outer surface of each capillary, and the laser beam irradiation efficiency decreases as the capillary number increases. However, by causing the side-entry laser-beam irradiation of the capillary array from both sides thereof, as described above, attenuations can cancel each other out, whereby a relatively uniform laser beam irradiation efficiency can be obtained with respect to each capillary. According to the result of the blank-triangle plot in FIG. 23, the laser beam irradiation efficiency of the 24 capillaries has an average value of 47% and a CV (Coefficient of Variation) value of 11%, indicating extremely high efficiency and uniformity. The laser beam irradiation efficiency becomes minimum at 42% for the capillary with capillary number 12 or 13 arrayed at the center. When the capillaries have the laser beam irradiation efficiency of not less than 0.4, it is possible to perform fluorescence detection with high sensitivity higher than or equal to that of commercially available capillary DNA sequencers. It is also empirically known that a practical level of fluorescence detection sensitivity can be obtained when the laser beam irradiation efficiency of the capillaries is not less than 0.2.

Figure 23:
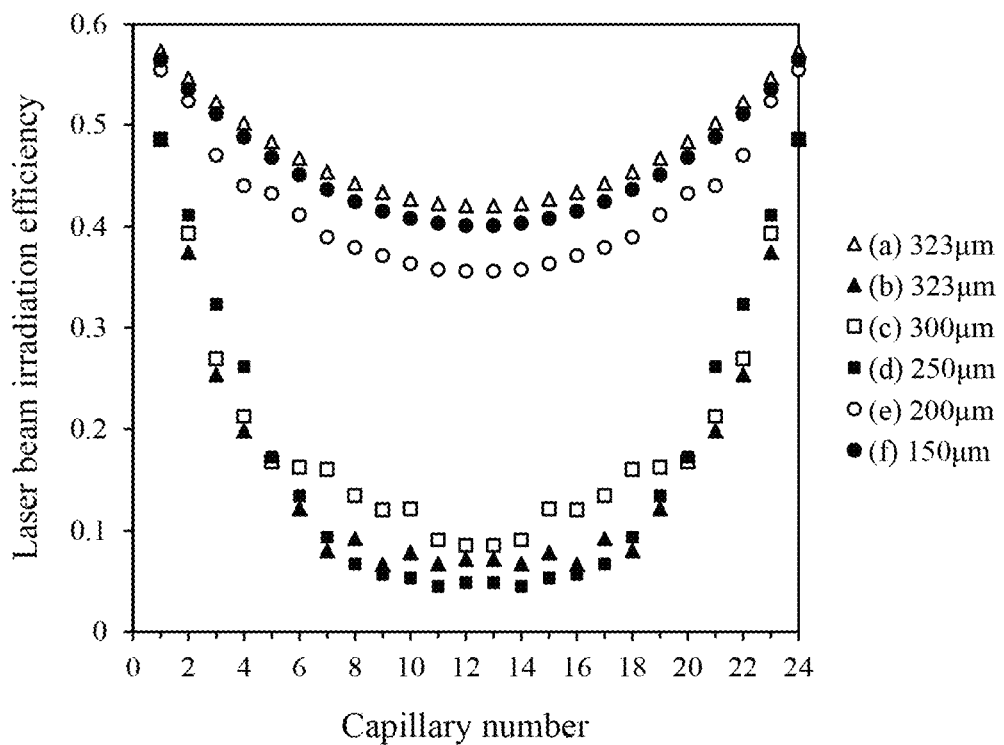
FIG. 23 illustrates the laser beam irradiation efficiency of 24 capillaries.

FIG. 22(b) illustrates the result in the case where, from the conditions of FIG. 22(a), the refractive index of the solution in the capillaries was reduced from 1.41 to 1.33 according to the conditions of the present example. Because the internal concave lens action of each capillary became stronger than the convex lens action of the glass portion of each capillary, the multiple-laser-beam-focusing technique failed to function, resulting in a significant divergence of the laser beam from the capillary array plane. In FIG. 23, the solid-triangle plot, determined by a method similar to that for the blank-triangle plot, indicates the laser beam irradiation efficiency in case of FIG. 22(b). The laser beam irradiation efficiency is sharply decreased with an average value of 17% and a CV value of 78%, and both efficiency and uniformity are greatly degraded, indicating that the conditions are not suitable for the simultaneous irradiation of the 24 capillaries.

In order to solve the problems that became newly clear from the above, the outer diameter of the capillaries was decreased to 300 μm, 250 μm, 200 μm, and 150 μm as illustrated in FIG. 22(c) to (f), in an attempt to increase the convex lens action of the glass portion of each capillary. The other conditions were the same as those of FIG. 22(b). As a result, as expected, the multiple-laser-beam-focusing technique began to function as the outer diameter was decreased. In FIG. 23, the blank-square plot, the solid-square plot, the blank-dot plot, and the solid-dot plot respectively indicate the results of similar determination of laser beam irradiation efficiency with respect to the outer diameter of 300 μm, 250 μm, 200 μm, and 150 μm. From FIG. 23, it became clear that when the outer diameter of the capillaries is less than 250 μm, functionality of the multiple-laser-beam-focusing technique is enhanced sharply. That is, the emitted fluorescence from a number of droplets flowing in the 24 capillaries can be simultaneously subjected to multicolor detection at high speed and with high sensitivity.

Figure 24:
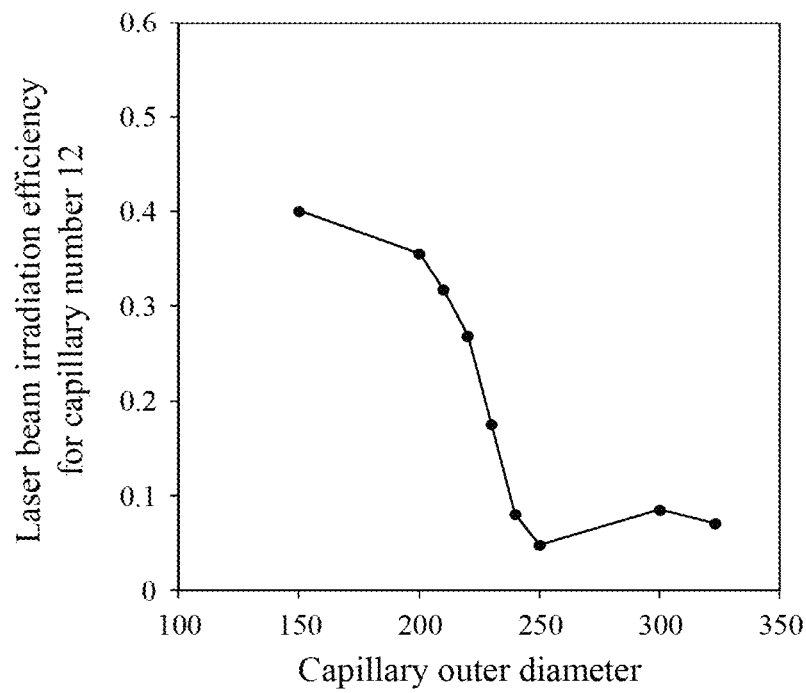
FIG. 24 illustrates the relationship between the capillary outer diameter and the laser beam irradiation efficiency of a capillary with capillary number 12.

FIG. 24 illustrates the results of a more detailed analysis of the foregoing, and indicates the relationship between the outer diameter of the capillaries and the laser beam irradiation efficiency with respect to the capillary with capillary number 12. It became clear that as the outer diameter of the capillary is decreased from 250 μm to 200 μm, multiple-laser-beam-focusing technique begins to function, and the laser beam irradiation efficiency is sharply improved. It was learned that in order to obtain the laser beam irradiation efficiency of 0.2 or more necessary for obtaining a practical level of fluorescence detection sensitivity, the outer diameter of the capillary may be not more than 227 μm.

Figure 26:
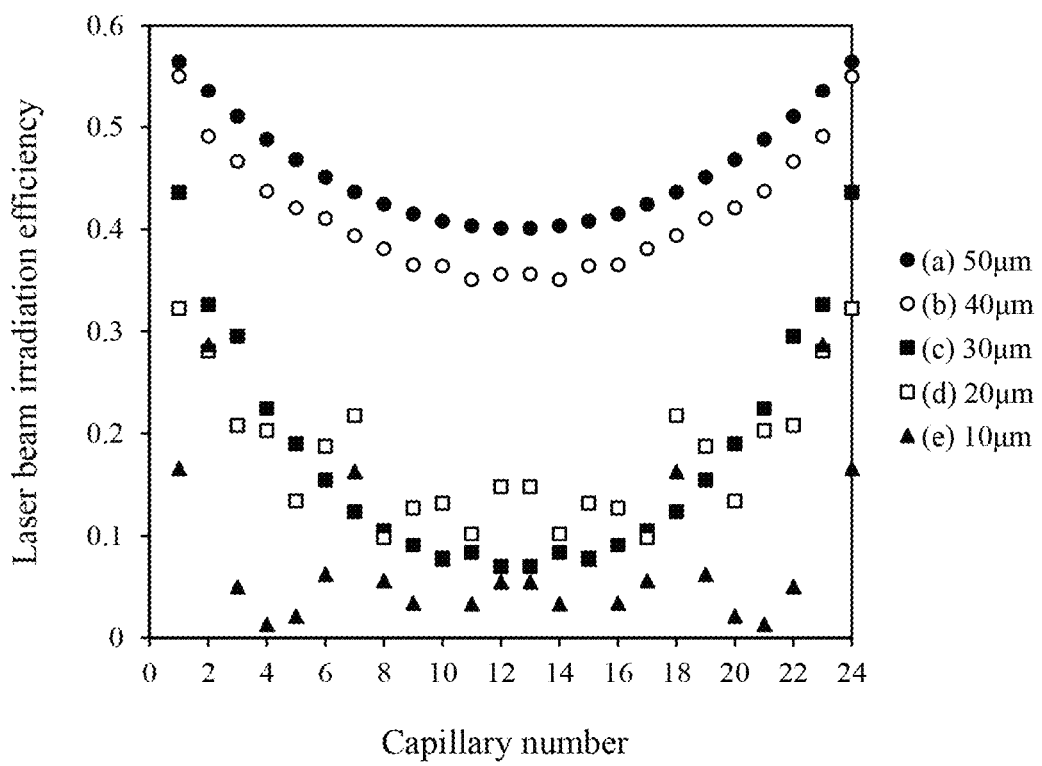
FIG. 26 illustrates the laser beam irradiation efficiency of 24 capillaries.

FIG. 25 illustrates the results of similar laser-beam ray-tracing simulations of side-entry laser-beam irradiation with respect to the aerial array of 24 capillaries with an outer diameter 150 μm, an inner diameter of 10 μm to 50 μm, and an array interval of 150 μm, where the capillaries were internally filled with a solution with a refractive index of 1.33. FIG. 25(a) indicates the result in the case of the inner diameter of 50 μm, where the only difference from FIG. 22(f) was that the array interval was reduced from 370 μm to 150 μm. In FIG. 26, the solid-dot plot indicates the result of similar computation of the laser beam irradiation efficiency in this case. The average value was 46% and the CV value was 12%, which are equivalent to those of the solid-dot plot of FIG. 23, indicating that both efficiency and uniformity were extremely high.

FIGS. 25(b), (c), (d), and (e) respectively illustrates the results in the case where, from the conditions of FIG. 25(a), the inner diameter was reduced to 40 μm, 30 μm, 20 μm, and 10 μm. As the inner diameter was decreased, this time the internal concave lens action of each capillary became strong, the multiple-laser-beam-focusing technique again failed to function, and the divergence of the laser beam from the capillary array plane became significant. In FIG. 26, the blank-dot plot, the solid-square plot, the blank-square plot, and the solid-triangle plot respectively indicate the results of similar determination of the laser beam irradiation efficiency with respect to the inner diameters of 40 μm, 30 μm, 20 μm, and 10 μm. From FIG. 26, it became clear that by making the inner diameter of the respective capillaries greater than 30 μm, the multiple-laser-beam-focusing technique can be caused to function. That is, the fluorescence emitted from a number of droplets flowing in the 24 capillaries can be simultaneously subjected to multicolor detection at high speed and with high sensitivity.

Figure 27:
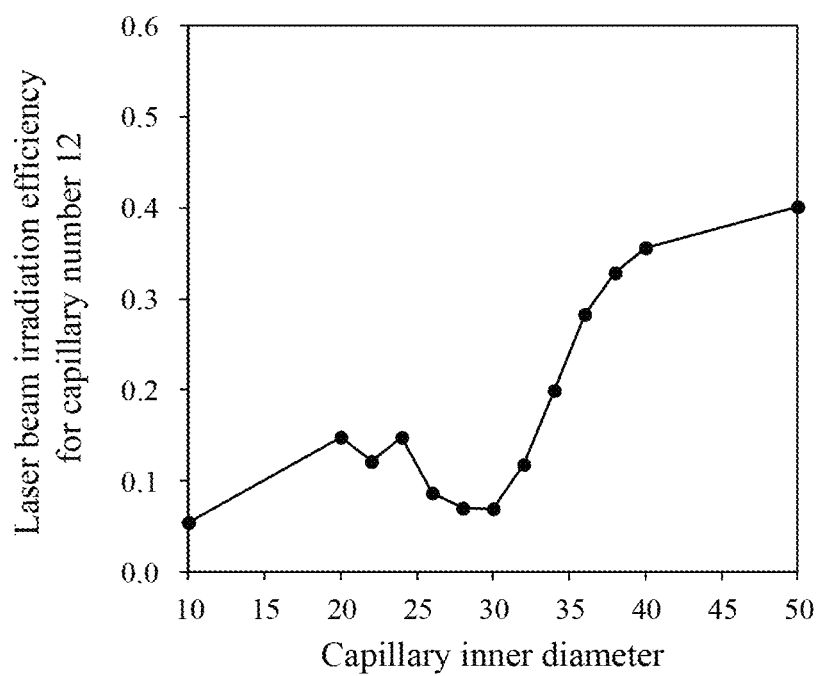
FIG. 27 illustrates the relationship between the capillary inner diameter and the laser beam irradiation efficiency of a capillary with capillary number 12.

FIG. 27 illustrates the results of a more detailed analysis of the foregoing, and indicates the relationship between the inner diameter of the capillary and the laser beam irradiation efficiency with respect to the capillary with capillary number 12. It became clear that as the inner diameter of the capillary is increased from 30 μm to 40 μm, multiple-laser-beam-focusing began to function, and the laser beam irradiation efficiency is sharply improved. It was learned that in order to obtain the laser beam irradiation efficiency of 0.2 or more necessary for obtaining a practical level of fluorescence detection sensitivity, the inner diameter of the capillary may be not less than 34 μm.

Figure 29:
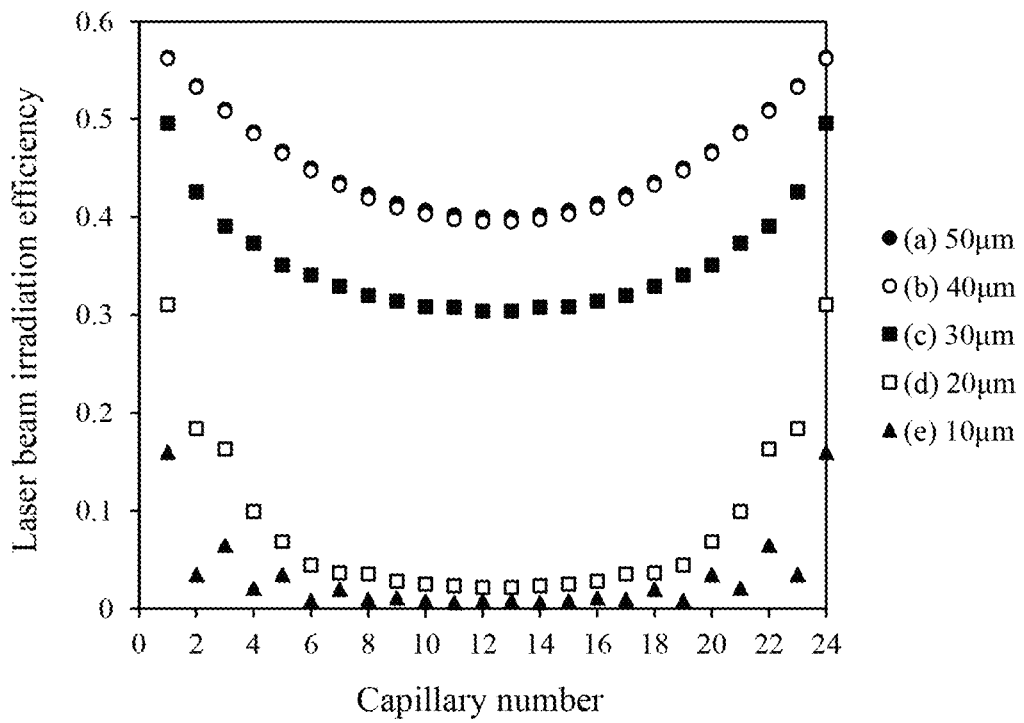
FIG. 29 illustrates the laser beam irradiation efficiency of 24 capillaries.

FIG. 28 illustrates the results of similar laser-beam ray-tracing simulations of side-entry laser-beam irradiation with respect to the aerial array of 24 capillaries with an outer diameter of 100 μm, an inner diameter of 10 μm to 50 μm, an array interval of 150 μm, where the capillaries were internally filled with a solution with a refractive index of 1.33. The outer diameter of the capillaries was further reduced from the case of FIG. 25 in an attempt to again enhance the convex lens action of the glass portion of each capillary. FIG. 28(a) illustrates the result in the case of the inner diameter of 50 μm, the only difference from FIG. 25(a) being that the outer diameter was reduced from 150 μm to 100 μm. In FIG. 29, the solid-dot plot indicates the result of similar computation of the laser beam irradiation efficiency in this case. The average value was 46% and the CV value was 12%, which are equivalent to those of the solid-dot plot of FIG. 26, indicating that both efficiency and uniformity were extremely high.

FIGS. 28(b), (c), (d), and (e) respectively illustrates the results in the case where, from the conditions of FIG. 28(a), the inner diameter was reduced to 40 μm, 30 μm, 20 μm, and 10 μm. As the inner diameter is reduced, the internal concave lens action of each capillary is enhanced, the multiple-laser-beam-focusing technique again fails to function, and the divergence of the laser beam from the capillary array plane became significant. In FIG. 29, the blank-dot plot, the solid-square plot, the blank-square plot, and the solid-triangle plot respectively indicate the results of similar determination of the laser beam irradiation efficiency with respect to the inner diameters of 40 μm, 30 μm, 20 μm, and 10 μm. From FIG. 29, it became clear that by making the inner diameter of the respective capillaries greater than 20 μm, the multiple-laser-beam-focusing technique can be caused to function. That is, the fluorescence emitted from a number of droplets flowing in the 24 capillaries can be simultaneously subjected to multicolor detection at high speed and with high sensitivity.

Figure 30:
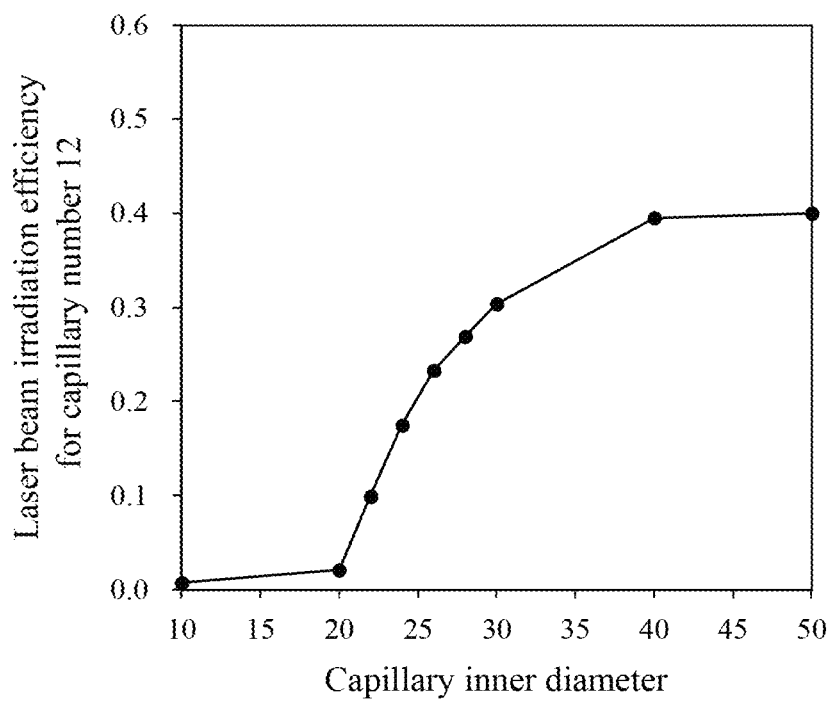
FIG. 30 illustrates the relationship between the capillary inner diameter and the laser beam irradiation efficiency of a capillary with capillary number 12.

FIG. 30 illustrates the result of a more detailed analysis of the foregoing, and indicates the relationship between the inner diameter of the capillary and the laser beam irradiation efficiency of capillary number 12. It became clear that as the inner diameter of the capillary is increased from 20 μm to 30 μm, the multiple-laser-beam focusing begins to function, and the laser beam irradiation efficiency is sharply improved. It was learned that in order to obtain the laser beam irradiation efficiency of 0.2 or more necessary for obtaining a practical level of fluorescence detection sensitivity, the inner diameter of the capillary may be not less than 25 μm. Thus, the threshold value of the inner diameter for causing the multiple-laser-beam-focusing technique to function is reduced from the case of FIG. 27. This is because the convex lens action has been enhanced by the reduction in outer diameter.

The results of FIG. 22 to FIG. 30 indicate that the multiple-laser-beam-focusing technique functions when the convex lens action of the glass portion of each capillary is stronger than the internal concave lens action of each capillary. The convex lens action becomes more enhanced as the outer diameter becomes smaller, while the concave lens action becomes more enhanced as the inner diameter becomes smaller. Accordingly, the multiple-laser-beam-focusing technique can be caused to function by making the ratio of outer diameter/inner diameter smaller than a constant value. According to the results of FIG. 24, it was learned that the ratio of outer diameter/inner diameter may be not more than 227/50=4.5. According to the results of FIG. 27, it was learned that the ratio of outer diameter/inner diameter may be not more than 150/34=4.4. According to the results of FIG. 30, it was learned that the ratio of outer diameter/inner diameter may be not more than 100/25=4.0. That is, it became clear that the ratio of outer diameter/inner diameter is preferably at least not more than 4.5 and more preferably not more than 4.0.

The diameter of the droplets handled in the present example is 40 μm assuming that the droplet is spherical. In a conventional ddPCR fluorescence detection section, channel short-axis width (capillary inner diameter)>droplet diameter. The above condition would be satisfied by using a capillary with an inner diameter of 50 μm, for example, and it would become possible to perform satisfactory fluorescence detection from the droplets. Meanwhile, a new effect may be obtained when channel short-axis width (capillary inner diameter)<droplet diameter. For example, by using a capillary with an inner diameter of 30 μm, the droplets are placed in a state of being crushed in the capillary, whereby the curvature of the interface of the droplets becomes smaller than the curvature when the droplets are spheres. In this case, the lens action of the droplets with respect to the laser beam becomes smaller, which is advantageous in detecting the droplets flowing in a plurality of channels or capillaries.

Example 3

In the light detection device according to the present example, a plurality of channels are configured in the same microchip. Unless specifically noted, the configuration and method are similar to those of Example 1. The microchip comprised a cycloolefin polymer (COP) with a refractive index of 1.53. With respect to each of a plurality of kinds of samples, after a total volume of 20 microliter was divided into about 5 million droplets with a volume of 4 picoliters in oil, PCR was performed. The droplets and oil of each sample were introduced into each of 24 channels by vacuum aspiration with the droplets being lined up single file, and then caused to flow. In this case, the droplet size was 20 μm in diameter assuming that the droplet was spherical.

Herein, in light of the above analysis, in order to effectively perform the detection by side-entry laser-beam irradiation, the difference between the refractive index of the droplet nd and the refractive index of oil no, or nd−no, needs to be $-0.02 \leq nd-no \leq 0.05$ and preferably $-0.01 \leq nd-no \leq 0.03$. In the present example, the oil used was Perfluorophenanthrene Aqsia from Bausch & Lomb with a refractive index of 1.33. On the other hand, for the droplets, a standard PCR solution with a refractive index of 1.33 was used to match the refractive index of oil. In addition, in order to stabilize the droplets in oil, 1% Pico-Surf 1 surfactant from Dolomite Microfluidics was mixed in oil.

Figure 31:
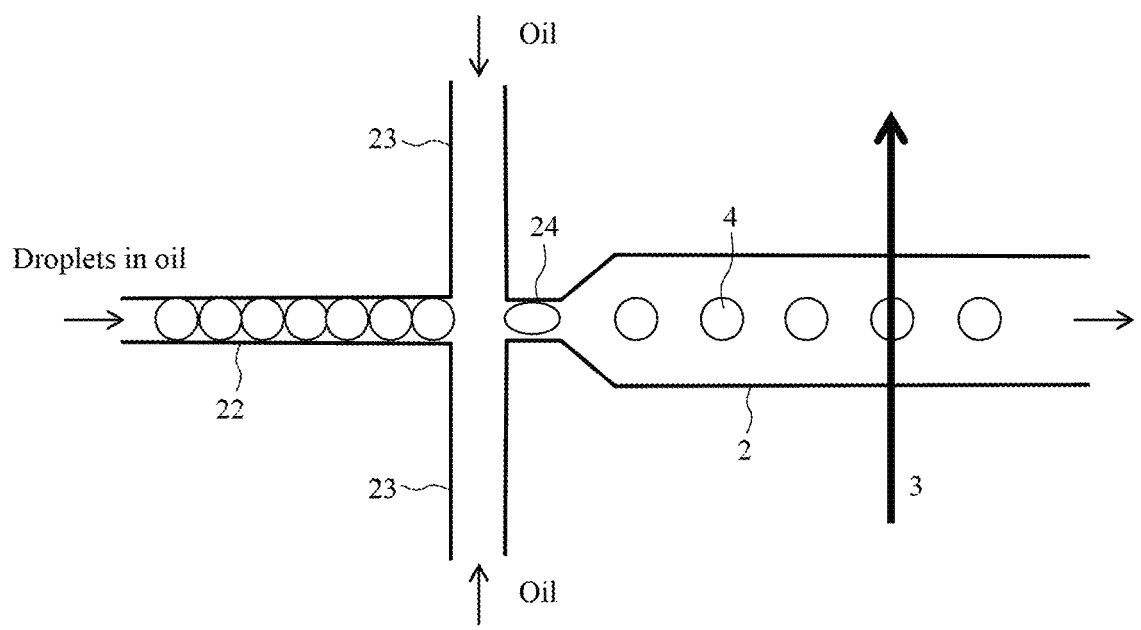
FIG. 31 schematically illustrates a configuration example of a microchip in which oil is added into a channel.

As illustrated in FIG. 31, in the fluorescence detection section of a conventional ddPCR device, a number of droplets 4 are lined up single file in a channel 22 and caused to flow therein. In addition, oil is added into the channel so as to increase the intervals of the droplets as they flow into a wider channel 2. The channel 2 is irradiated with a laser beam 3 so as to irradiate the individual droplets 4 in sequence, and the fluorescence emitted from the individual droplets is measured in sequence. In the channel 22 positioned upstream of the position irradiated with the laser beam 3, a number of droplets are lined up single file at smaller intervals. As the oil is additionally supplied from channels 23 which are connected to the channel 22 from two directions, a number of droplets in the channel 2 are arrayed at greater intervals while being lined up single file. At the intermediate position between the channels 22 and 23 and the channel 2, a channel 24 is present. The short-axis width of the channel 2 is greater than the short-axis width of the channel 22. The short-axis width of the channel 24 is equal to or smaller than the short-axis width of the channel 22. These structures are formed in the same microchip.

In the following, a configuration in which a plurality of channels 22 are arrayed and irradiated by a side-entry laser beam will be discussed. While FIG. 32 and FIG. 33 each illustrate only three channels 22, this is for sake of simplicity, and the number of the channels is obviously not limited to three.

Figure 32:
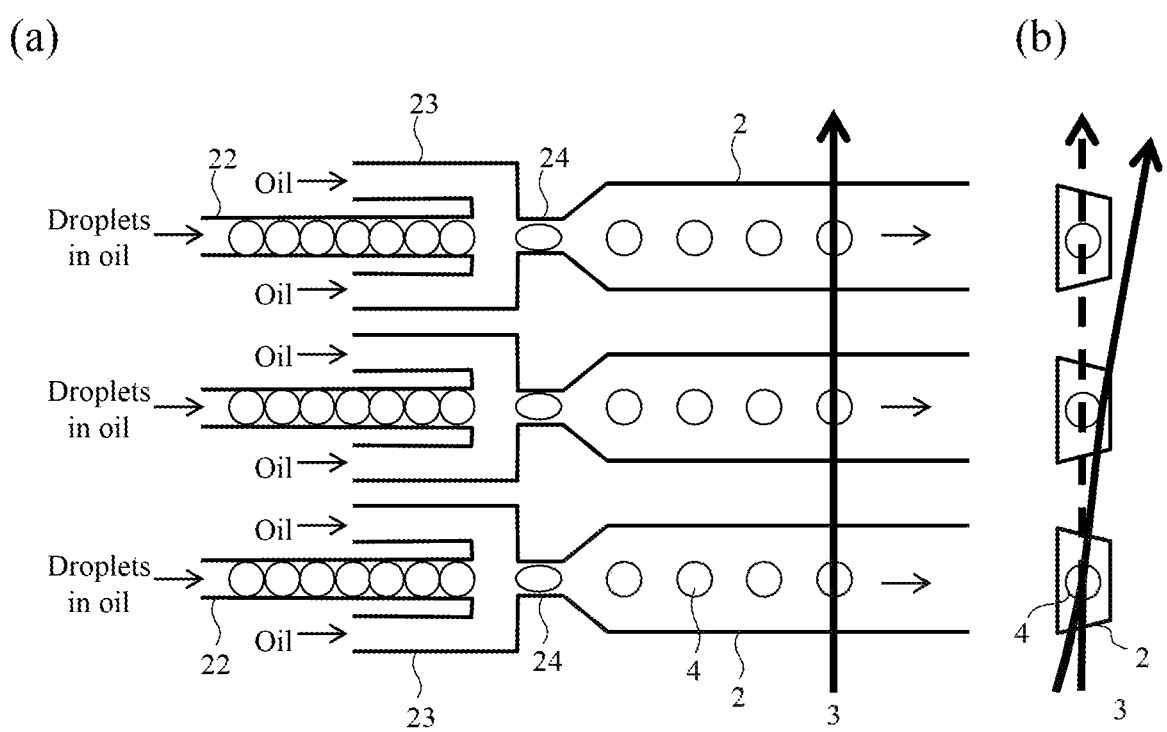
FIG. 32 schematically illustrates a configuration example of a microchip in which a laser beam is incident on a side of a plurality of channels.

As illustrated in FIG. 32(a), the configuration of FIG. 31 was parallelized in the same microchip, and side-entry laser-beam irradiation was applied to a plurality of channels 2. FIG. 32(b) is a cross sectional view perpendicular to the long axes of the respective channels 2 at the position irradiated with the laser beam 3 in FIG. 32(a). As illustrated in FIG. 32(b), similarly to FIG. 12(b), the respective channels 2 have a trapezoidal cross section. Accordingly, the laser beam 3 as it passes through the side surfaces of the respective channels 2 is subjected to refraction in one direction, and deviates from the array plane of the channels 2. That is, it became clear that with the configuration of FIG. 32, it is difficult to detect the droplets flowing in the plurality of channels 2 at once.

Figure 33:
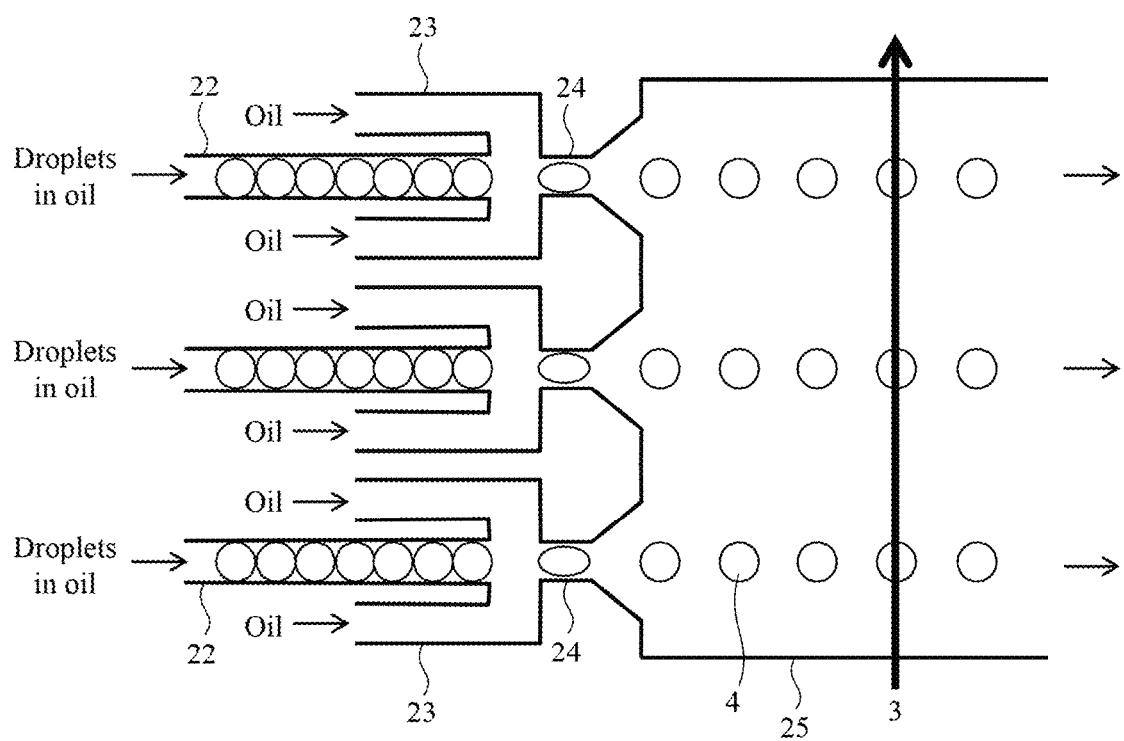
FIG. 33 schematically illustrates a configuration example of a microchip including a merged channel.

Accordingly, as illustrated in FIG. 33, the separating walls between the respective channels 2 at the laser beam irradiated position were removed, and the plurality of channels 2 were merged into a single merged channel 25. The width of the merged channel 25 in the central axis direction of the laser beam 3 is greater than the sum of the widths of the plurality of channels 22. Such configuration can be fabricated in the same microchip by means of injection molding and the like capable of mass production. In the illustrated example, the flow path section of the light detection device is configured of a microchip provided with the single merged channel 25. The merged channel 25 has retained therein a plurality of lines of flow in which a plurality of droplets dispersed in oil are moved along linear flows. By forming the plurality of channels 22 on the same plane, it becomes possible to arrange the plurality of lines of flow, which flow out of the respective channels 22 and which are formed in the merged channel 25, on the array plane. The plurality of lines of flow also include the laser beam irradiated portion in the merged channel 25.

In this configuration, the problem of refraction of the laser beam 3 at the side surfaces of the respective channels 2 as discussed with reference to FIG. 32 can be avoided. Accordingly, it becomes possible for the laser beam 3 to travel in the merged channel 25 in the direction in which the plurality of lines of flow are arrayed, and to irradiate the droplets in the lines of flow flowing out of the respective channels 22 and 24 for fluorescence detection. However, the laser beam 3 may be refracted at the entry side surface of the merged channel 25. Thus, it is effective to cause the laser beam 3 to enter the merged channel 25 of the flow path section at an angle from being parallel to the array plane of the channels 22 so that the laser beam 3 is adjusted to be parallel to the array plane of the lines of flow in the merged channel 25.

Herein, as illustrated in FIG. 33, it is important that the droplets 4 in the lines of flow flowing out of the respective channels 22 and 24 do not become mixed in the merged channel 25. That is, it is important for the droplets flowing out of the respective channels 22 and 24 to remain being lined up single file and flow over the array plane set in the merged channel 25. For this purpose, it is necessary for the droplets and oil to be in laminar flow in the merged channel 25.

Figure 34:
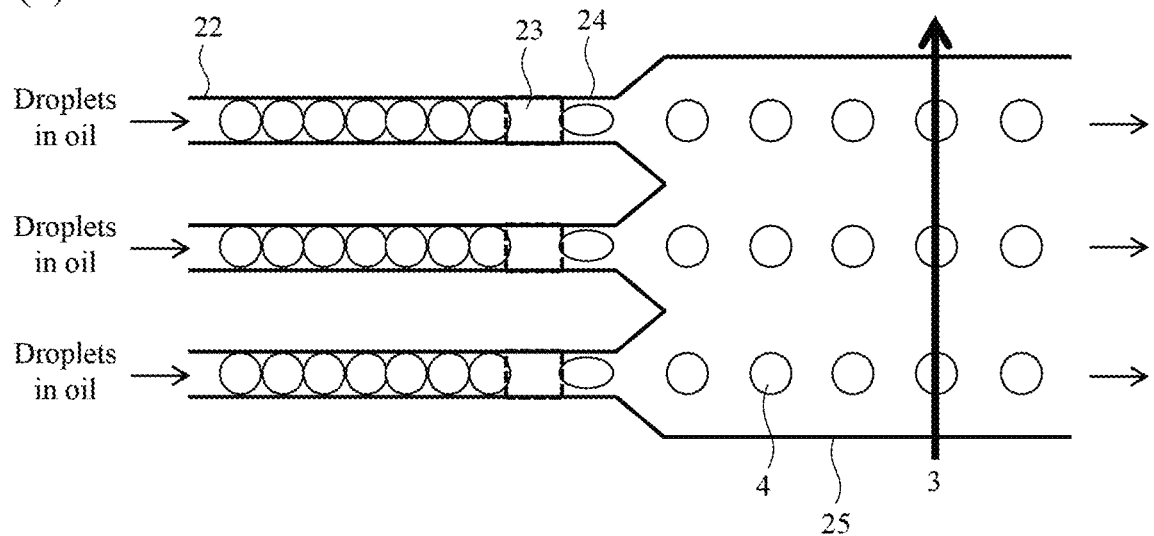
FIG. 34 schematically illustrates another configuration example of a microchip including a merged channel.
Figure 34:
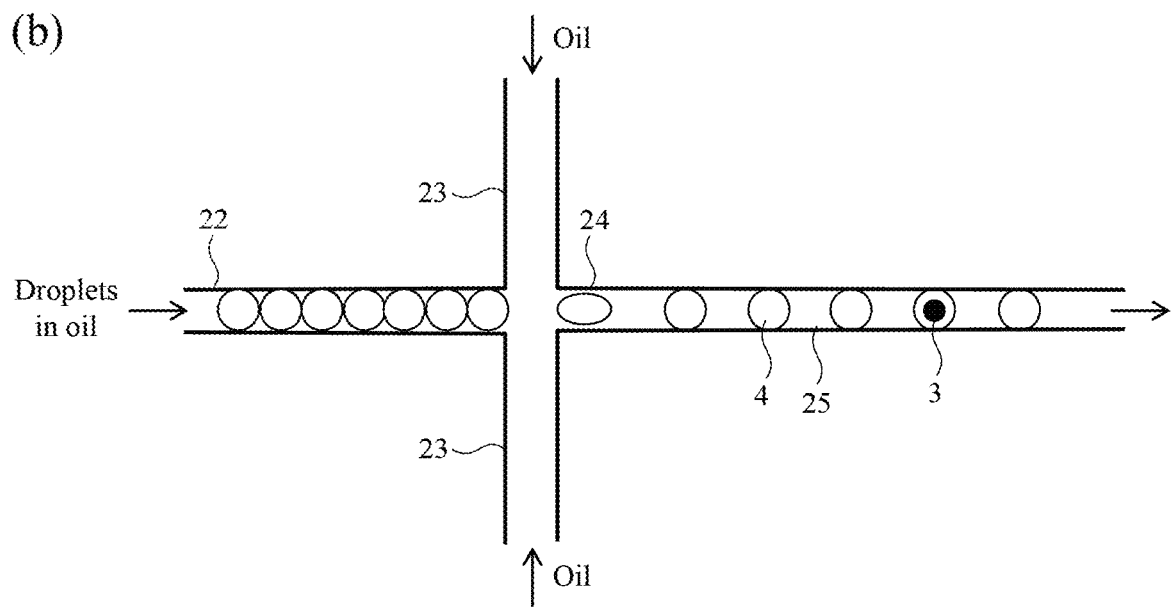

FIG. 34 is a schematic diagram of another configuration example of the microchip including the flow path section that is the merged channel. In the configuration illustrated in FIG. 33, the width of the merged channel 25 in the central axis direction of the laser beam 3 is greater than the total of the widths of the respective channels 2 of FIG. 32 in the central axis direction of the laser beam 3. In order to maintain laminar flow under this condition, it is necessary to supply more oil from the channels 23 in FIG. 33 than in the case of FIG. 32, and it is also difficult to control the laminar flow. Accordingly, as illustrated in FIG. 34, the channels 23 are connected from two directions perpendicular to the array plane of the respective channels 22, and oil is additionally supplied from the two directions. FIG. 34(a) is a view from the vertical direction with respect to the array plane of the channels 22. FIG. 34(b) is a view from the parallel direction with respect to the array plane. The configuration makes it possible to decrease the interval of the respective channels 22 compared with the case of FIG. 32 or FIG. 33, and, as a result, to decrease the width of the merged channel 25 in the central axis direction of the laser beam 3 compared with the case of FIG. 33. Herein, the respective channels 23 may not necessarily be perpendicular to the array plane of the respective channels 22, and may be inclined with respect to the array plane. The configuration only needs to be able to decrease the array interval of the respective channels 22. In FIG. 34, the width of the merged channel 25 in the central axis direction of the laser beam 3 is equal to the total of the widths of the respective channels 2 in the central axis direction of the laser beam 3 in FIG. 32. That is, the amount of oil supplied from the channels 23 in FIG. 34 may be the same as in the case of FIG. 32, and the laminar flow can be controlled as in FIG. 31 or FIG. 32.

Figure 35:
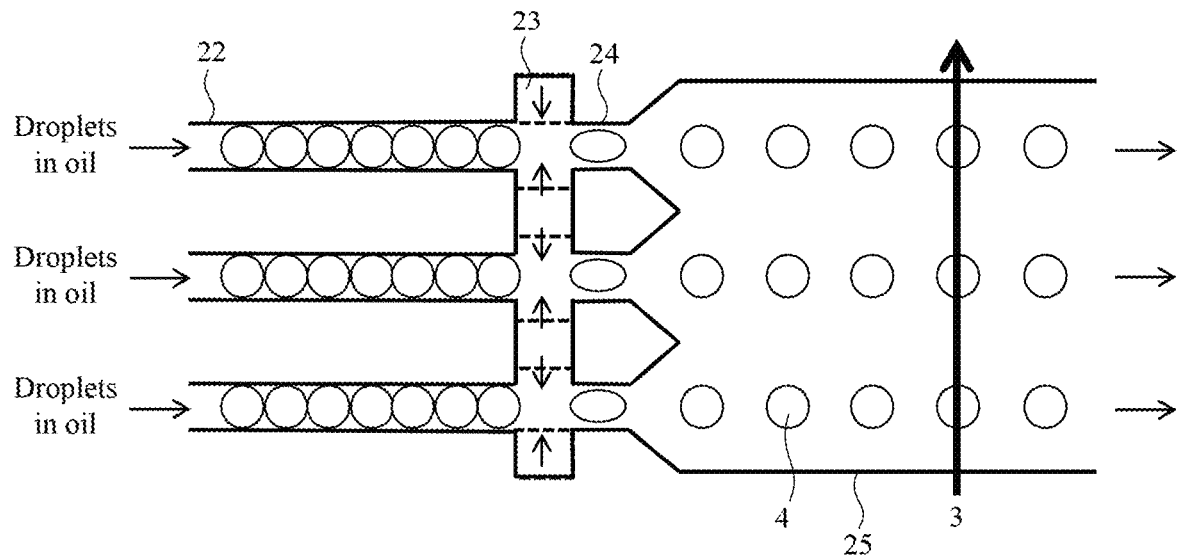
FIG. 35 schematically illustrates another configuration example of a microchip including a merged channel.
Figure 35:
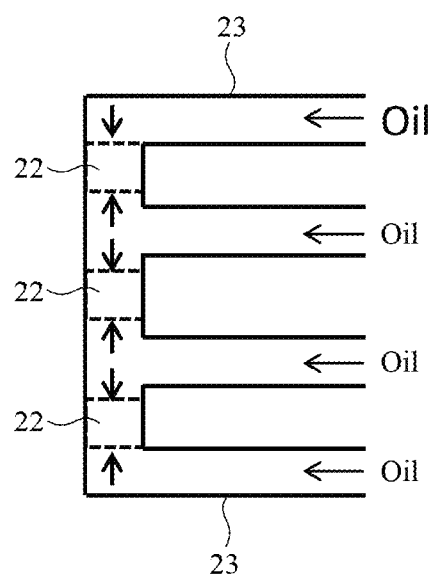

FIG. 35 is a schematic diagram of another configuration example of the microchip including the merged channel, illustrating a modification of FIG. 34. A plurality of lines of flow in which a plurality of droplets dispersed in oil are moved along linear flows are retained on the array plane in the merged channel 25. The channels 23 for additionally supplying oil approach the array plane of the respective channels 22 from one direction perpendicular thereto, and are bent at right angles at the array plane before being connected to the respective channels 22. FIG. 35(a) is a view from the vertical direction with respect to the array plane of the respective channels 22. FIG. 35(b) is a cross sectional view of the connected portions of the channels 23 and the channels 22 of FIG. 35(a). Thus, according to the configuration of FIG. 35, as in FIG. 33, oil can be added from a vertical direction with respect to the flows of the droplet 4 and oil in the respective channels 22, and at the same time, as in FIG. 34, the array interval of the respective channels 22 can be decreased.

Figure 36:
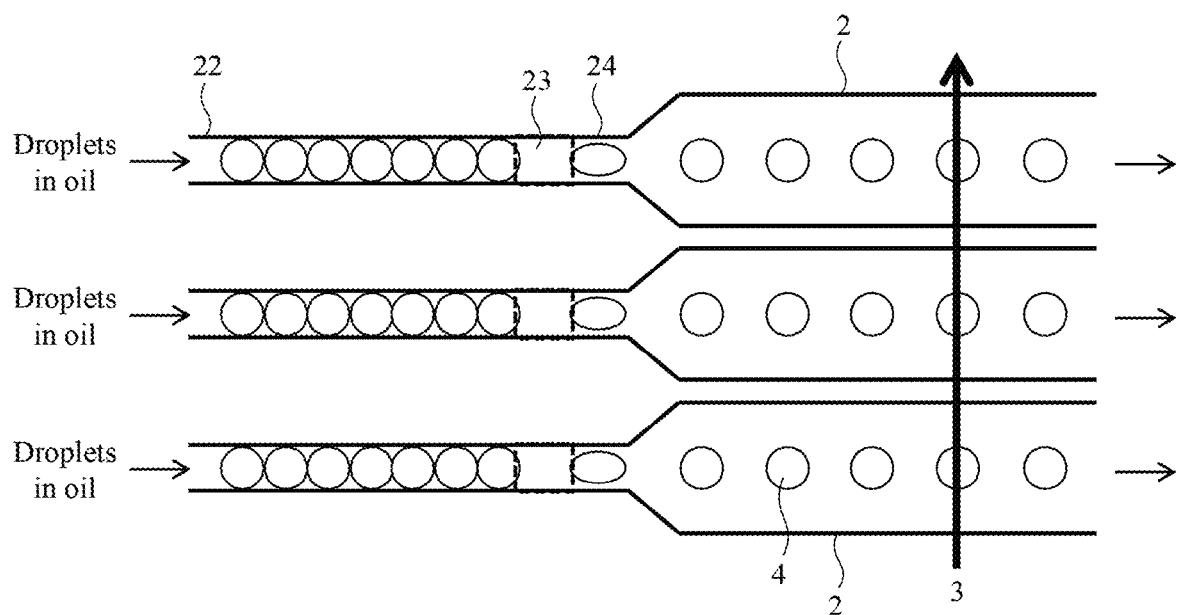
FIG. 36 schematically illustrates a configuration example of a microchip in which oil is added from a vertical direction with respect to an array plane of a plurality of channels.

FIG. 36 is a schematic diagram of a configuration example in which the array interval of the channel 2 is decreased by making the configuration of the channels 23 in FIG. 32 similar to FIG. 34. That is, in the respective channels 22, oil is supplied from a vertical direction with respect to the array plane of the channels 22. As in FIG. 32, the respective channels 2 are not merged and remain separated. In this configuration, the influence of refraction of the laser beam 3 by the side surfaces of the respective channels 2, as illustrated in FIG. 32(b), cannot be avoided. However, because the array interval of the channel 2 is decreased, the number of the channels 2 that can be irradiated before the laser beam 3 deviates from the array plane can be increased.

Figure 37:
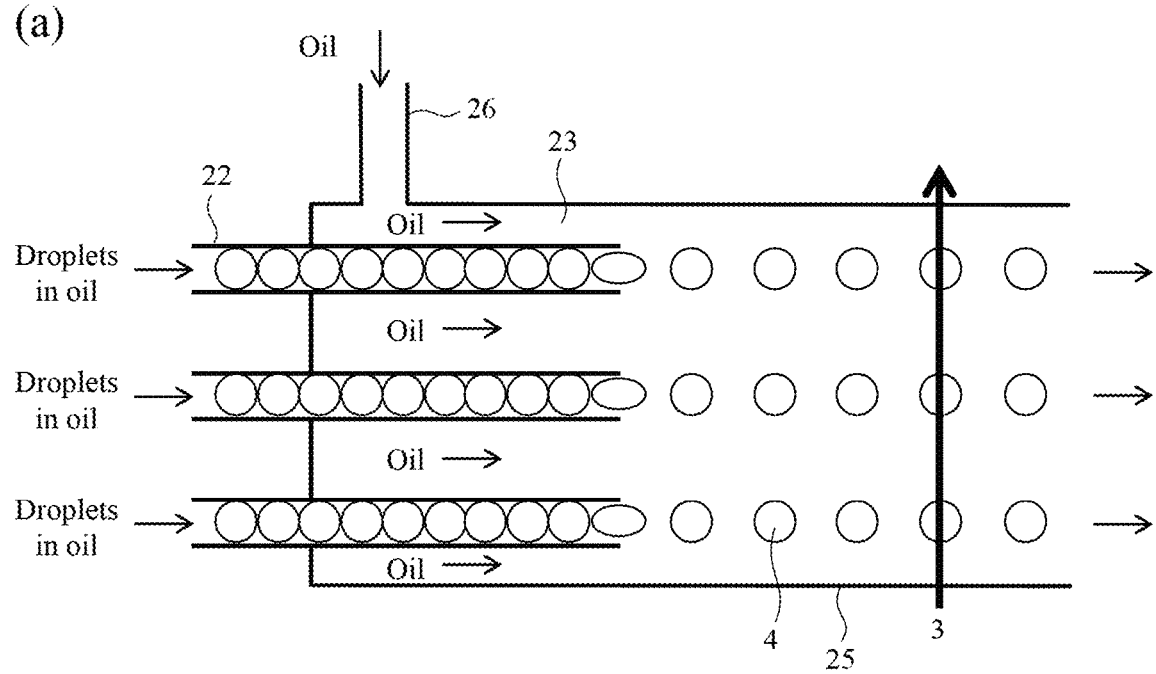
FIG. 37 schematically illustrates another configuration example of a microchip including a merged channel.
Figure 37:
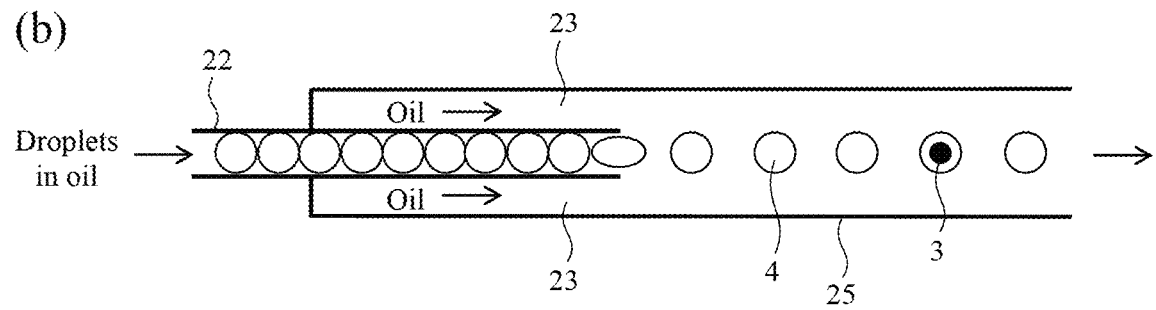

FIG. 37 is a schematic diagram of another configuration example of the microchip including the merged channel, illustrating a modification of FIG. 34. The respective channels 22 comprise capillaries, and a plurality of lines of flow of the droplets 4 flowing out of the capillaries into the merged channel 25 are moved on the array plane. FIG. 37(a) is a view from a vertical direction with respect to the array plane of the channels 22. FIG. 37(b) is a view from a parallel direction with respect to the array plane. The droplets 4 and oil that flow in the respective channels 22 are discharged into the merged channel 25 from the ends of the respective channels 22, and form the lines of flow. At the same time, oil supplied from a channel 26 encloses the peripheries of the respective channels 22 and flows in the same direction as the lines of flow. As a result, as in the case of FIG. 34, the droplets 4 being discharged from the respective channels 22 respectively form the lines of flow without becoming mixed, and move on the array plane while being lined up single file. That is, the droplets and oil are adjusted to form a laminar flow in the merged channel 25.

Example 4

In the present example, an example of application of the present invention to an analysis method other than ddPCR will be described. The number of Escherichia coli included in a large amount of specimen with a volume of 1 milliliter as the sample was digitally counted. The 1 milliliter of specimen was divided into about 30 million droplets of 34 picoliters in oil. Meanwhile, 1 milliliter of reagent was divided into about 30 million droplets of 34 picoliters in oil. The droplets of the specimen and the droplets of the reagent were mixed one to one, and about 30 million droplets of 68 picoliters were fabricated. This can be performed using a microchip device according to conventional technology. In the microchip device, a step of mixing one droplet of the specimen flowing in channel α and one droplet of the reagent flowing in channel β in channel γ consolidating the channel α and channel β is continuously repeated for a number of droplets. In this case, the mixed droplet size is 50 μm in diameter. The reagent includes an enzyme that facilitate lysis of Escherichia coli, and a DNAzime sensor which emits fluorescence upon bonding of a decomposed product of Escherichia coli. In order to confirm the presence of droplets that do not include Escherichia coli, a constant concentration of a fluorophore having an emission wavelength different from the above was mixed in the reagent. In this way, all of the droplets included the same kind and the same concentration of fluorophore, making it possible to digitally count all of the droplets.

The fabricated group of droplets was transferred to a sample container and left to stand at room temperature for two hours for lysis of Escherichia coli and cause a reaction of the dissolved product and the DNAzime sensor. Thereafter, in a microchip which had the structure of the flow path section and the laser beam irradiation section illustrated in FIG. 34 and in which 100 channels 22 were parallelized, the group of droplets was divided into 100 parts and each introduced into each of the channels 22 and caused to flow. Then, in the merged channel 25, the laser beam 3 was entered from the side of the merged channel 25 to irradiate in parallel a plurality of droplets being discharged from the respective channels 22 and respectively forming lines of flow, and the emitted fluorescence was simultaneously detected from a vertical direction with respect to the array plane of the lines of flow.

The droplets were detected at 1 kHz with respect to each of the channels 22, i.e., at the rate of 1000 droplets per second. If the detection is performed using only one channel, it would take eight hours or longer to detect all of the 30 million droplets. In the present example, 100 channels were used to perform parallel detection at the same detection speed, it was possible to detect the 30 million droplets in only five minutes.

The present invention is not limited to the above-described Examples and may include various modifications. The Examples have been described in detail for the purpose of facilitating an understanding of the present invention, and are not necessarily limited to those provided with all of the configurations described. A part of the configuration of one Example may be replaced with the configuration of another Example, or the configuration of the other Example may be incorporated into the configuration of the one Example. With respect to a part of the configuration of each of the Examples, addition, deletion, or substitution of other configurations may be made.

REFERENCE SIGNS LIST

1 Microchip
2 Channel
3 Laser beam
4 Droplets
5 Laser light source
6 Collection lens
7 Filter and diffraction grating
8 Imaging lens
9 Sensor
10 Data processing unit
11 Light emitting point
12 Line sensor
13 Entry
14 Exit
15 Oil entry
16 Capillary
17 Upper substrate
18 Lower substrate
20 Intermediate substrate
22 Channel
25 Merged channel
27 Individual collection lens
28 Optical fiber
29 Individual collection lens 30 Photomultiplier
31 Dichroic mirror
32 Photomultiplier array
33 Optical fiber switch
34 Consolidated optical fiber

The invention claimed is:

1. A light detection device comprising:
an oil of a refractive index no;
a plurality of droplets, each of the plurality of droplets having a refractive index nd, wherein a difference in the refractive index nd of each droplet and the refractive index no of the oil is −0.02≤nd−no≤0.05;
a flow path section in which a plurality of independent lines of flow each comprising one or more of the plurality of droplets dispersed in the oil along a linear flow is retained on an array plane, the plurality of independent lines of flow formed in a plurality of channels arrayed on the array plane on a microchip, or in a plurality of capillaries
a laser beam irradiation section which introduces a laser beam in a direction in which the plurality of independent lines of flow in the flow path section are arrayed to irradiate the plurality of independent lines of flow; and
a light detection section which detects emitted light generated from the independent lines of flow by the irradiation of the laser beam, from a vertical direction with respect to the array plane.

2. The light detection device according to claim 1, wherein the difference between the refractive index of oil no and the refractive index of the each of the plurality of droplets nd is such that −0.01≤nd−no≤0.03.

3. The light detection device according to claim 1, wherein:
the refractive index of the each of the plurality of droplets nd is nd=1.33; and
the refractive index of oil no is such that 1.30≤no≤1.34.

4. The light detection device according to claim 1, wherein:
the plurality of independent lines of flow are respectively formed in the plurality of channels arrayed on the array plane in the microchip; and
the plurality of channels have a quadrangle cross sectional shape, and an angle formed by a side surface through which the laser beam is passed and the array plane is in a range of 90±1.5 degrees.

5. The light detection device according to claim 4, wherein the plurality of droplets are in a crushed state when they are in the plurality of channels.

6. The light detection device according to claim 1, wherein:
the plurality of independent lines of flow are respectively formed in the plurality of capillaries, and wherein the plurality of capillaries are arrayed in mid-air on the array plane; and
the plurality of capillaries have an outer diameter of not more than 227 μm.

7. The light detection device according to claim 6, wherein the plurality of droplets are in a crushed state when they are inside the plurality of capillaries.

8. The light detection device according to claim 1, wherein:
the plurality of independent lines of flow are respectively formed in the plurality of capillaries, and wherein the plurality of capillaries are arrayed in mid-air on the array plane; and
the plurality of capillaries have an inner diameter of not less than 25 μm.

9. The light detection device according to claim 1, wherein:
the plurality of independent lines of flow are respectively formed in the plurality of capillaries, and wherein the plurality of capillaries are arrayed in mid-air on the array plane; and
the plurality of capillaries have a ratio of an outer diameter to an inner diameter thereof is not more than 4.5.

10. The light detection device according to claim 1, wherein the plurality of independent lines of flow have a portion irradiated with the laser beam in a single channel provided in a microchip.

11. The light detection device according to claim 10, wherein:
the plurality of independent lines of flow have at least a part in the flow upstream of the portion irradiated with the laser beam respectively in the plurality of channels arrayed on the array plane in the microchip; and
the single channel has a width in a central axis direction of the laser beam which is greater than a total of widths of the plurality of channels in the same direction.

12. The light detection device according to claim 11, wherein each of the plurality of channels has a channel connected thereto for additionally supplying oil.

13. The light detection device according to claim 12, wherein the additional supply of oil is performed in a direction inclined with respect to the array plane.

14. The light detection device according to claim 12, wherein the additional supply of oil is performed in a direction perpendicular to the array plane.

15. The light detection device according to claim 10, wherein the laser beam introduced into the flow path section has a central axis which is inclined with respect to the array plane.

16. The light detection device according to claim 1, wherein the light detection section includes one or a plurality of line sensors.

17. The light detection device according to claim 1, wherein the light detection section includes a wavelength dispersion element and a plurality of line sensors, wherein different wavelengths of emitted light are respectively detected by different line sensors.

18. The light detection device according to claim 1, wherein the light detection section includes a plurality of photomultipliers or a single photomultiplier array.

19. The light detection device according to claim 18, wherein emitted light from the respective independent lines of flow is detected by the plurality of photomultipliers or the single photomultiplier array via respectively different optical fibers.

20. The light detection device according to claim 1, wherein the respective droplets include a fluorophore of the same kind and an equal concentration.

* * * * *